US009310106B2

(12) United States Patent
Honda

(10) Patent No.: US 9,310,106 B2
(45) Date of Patent: Apr. 12, 2016

(54) HEAT PUMP SYSTEM

(75) Inventor: Masahiro Honda, Sakai (BE)

(73) Assignees: Daikin Industries, Ltd., Osaka (JP);
Daikin Europe N.V., Oostende (BE)

(*) Notice: Subject to any disclaimer, the term of this patent is extended or adjusted under 35 U.S.C. 154(b) by 961 days.

(21) Appl. No.: 13/519,288

(22) PCT Filed: Dec. 28, 2009

(86) PCT No.: PCT/JP2009/007357
§ 371 (c)(1),
(2), (4) Date: Jun. 26, 2012

(87) PCT Pub. No.: WO2011/080805
PCT Pub. Date: Jul. 7, 2011

(65) Prior Publication Data
US 2012/0285188 A1 Nov. 15, 2012

(51) Int. Cl.
F25B 13/00 (2006.01)
F25B 7/00 (2006.01)
(Continued)

(52) U.S. Cl.
CPC .............. *F25B 7/00* (2013.01); *F25B 29/003* (2013.01); *F24F 2203/02* (2013.01); *F25B 13/00* (2013.01); *F25B 25/005* (2013.01); *F25B 2313/02743* (2013.01); *F25B 2339/047* (2013.01);
(Continued)

(58) Field of Classification Search
CPC ........ F25B 7/00; F25B 29/003; F25B 25/005; F25B 2600/13; F25B 2313/02743; F25B 13/00; F25B 2400/06; F25B 2600/02; F25B 2339/047; F25B 2203/02

USPC .......................................................... 62/160
See application file for complete search history.

(56) References Cited

U.S. PATENT DOCUMENTS

2006/0005558 A1* 1/2006 Otake ..................... F25B 9/008
62/260
2011/0088421 A1 4/2011 Wakamoto et al.
2011/0113802 A1 5/2011 Wakamoto et al.

FOREIGN PATENT DOCUMENTS

JP 55-105863 U 7/1980
JP 60-164157 A 8/1985
JP 62-152162 U 9/1987
(Continued)

OTHER PUBLICATIONS

International Preliminary Report of corresponding PCT Application No. PCT/JP2009/007357.
(Continued)

*Primary Examiner* — M. Alexandra Elve
*Assistant Examiner* — Larry Furdge
(74) *Attorney, Agent, or Firm* — Global IP Counselors

(57) ABSTRACT

A heat pump system includes a refrigerant circuit and a controller. The refrigerant circuit has usage units connected to a heat source unit. The usage units have first usage-side heat exchangers and second usage-side heat exchangers. The heat source unit has heat-source-side heat exchanger and a compressor. The controller causes the heat-source-side heat exchanger to function as an evaporator or as a radiator in accordance with an overall heat load of the usage units when the heating operation or the cooling operation has been set for each of the usage units. The aqueous medium is heated by heat radiation of the refrigerant in the first usage-side heat exchangers in the heating operating, and is cooled by evaporation of the heat-source-side refrigerant in the second usage-side heat exchangers in the cooling operation.

16 Claims, 4 Drawing Sheets

(51) Int. Cl.
*F25B 29/00* (2006.01)
*F25B 25/00* (2006.01)

(52) U.S. Cl.
CPC ......... *F25B2400/06* (2013.01); *F25B 2600/02* (2013.01); *F25B 2600/13* (2013.01); *Y02B 30/745* (2013.01)

(56) References Cited

FOREIGN PATENT DOCUMENTS

| | | |
|---|---|---|
| JP | 2-57875 A | 2/1990 |
| JP | 6-50631 A | 2/1994 |
| JP | 6-265231 A | 9/1994 |
| JP | 8-94206 A | 4/1996 |
| JP | 2003-314838 A | 11/2003 |
| JP | 2003-343936 A | 12/2003 |
| JP | 2004-226015 A | 8/2004 |
| WO | WO-2009/122476 A1 | 10/2009 |
| WO | 2009/133640 A1 | 11/2009 |
| WO | 2009/133644 A1 | 11/2009 |

OTHER PUBLICATIONS

International Search Report of corresponding PCT Application No. PCT/JP2009/007357.

* cited by examiner

HEAT PUMP SYSTEM

TECHNICAL FIELD

The present invention relates to a heat pump system, and particularly relates to a heat pump system configured by connecting a usage unit for performing an aqueous medium heating operation to a heat source unit via a refrigerant communication tube.

BACKGROUND ART

Japanese Laid-open Patent Application No. 60-164157is a conventional heat pump hot-water supply apparatus, The heat pump hot-water supply apparatus (heat pump system) is capable of using heat pump cycle to heat water, and to feed the resulting warm water to the hot-water storage tank. More specifically, the heat pump system has a compressor, a condenser (usage-side heat exchanger), and an evaporator (heat-source-side heat exchanger), and is capable of heating water by heat radiation of the refrigerant in the refrigerant/water heat exchanger to obtain warm water.

Japanese Laid-open Patent Application No. 2003-314838is a heat pump-type warm water/air-warming apparatus. The heat pump-type warm water/air-warming apparatus (heat pump system) is capable of heating water using the heat pump cycle and carrying out air-warming operation (heating operation) by feeding the resulting warm water to a floor air-warming panel. More specifically, the heat pump system is composed of a warm-water supply unit (usage unit) having a refrigerant-to-water heat exchanger (usage-side heat exchanger), the warm-water supply unit being connected to an outdoor unit (heat source unit) having a compressor and evaporator (heat-source-side heat exchanger) via a refrigerant communication tube. With this heat pump system, water can be heated by heat radiation of a refrigerant in the usage-side heat exchanger to obtain warm water.

SUMMARY

Conventional heat pump systems have higher environmental performance than boilers and/or other combustion-type hot-water supply apparatuses or warm-water/air-warming apparatuses, and are therefore attracting widespread attention.

However, in order to install the conventional heat pump system, space is required to install a heat source unit, and although this is mostly no problem for detached homes, it is often the case that space cannot be acquired to install individual heat source units for each unit of a residential complex.

In a residential complex, windows are often kept closed in contrast to detached homes in order to shut out peripheral noise and the like, and it is often the case that not only is heating operation required, but also air-cooling operation (cooling operation) is required due to the highly airtight nature of the building.

Therefore, there are problems in that cooling operation is required, and installation space for the heat source unit is required when the heat pump system is installed in a residential complex, and there is currently no heat pump system suitable for a residential complex that can solve these problems. These problems are not limited to residential complexes, but may also arise in buildings, hotels, and the like in which hot-water supply apparatus and a warm-water/air-cooling apparatus are required for each floor or area.

An object of the present invention is to provide a heat pump system suitable for residential complexes, wherein the heat pump system configured by connecting a usage unit for performing an aqueous medium heating operation to a heat source unit via a refrigerant communication tube.

A heat pump system according to a first aspect of the present invention has a heat-source-side refrigerant circuit and a controller. The heat-source-side refrigerant circuit has usage units connected to a heat source unit via refrigerant communication tubes, the usage units having first usage-side heat exchangers, and the heat source unit having a heat-source-side heat exchanger and a heat-source-side compressor for compressing a heat-source-side refrigerant. The controller is capable of carrying out a heating operation for heating an aqueous medium by heat radiation of the heat-source-side refrigerant in the first usage-side heat exchangers. A plurality of the usage units are connected to the heat source unit. The usage units further have second usage-side heat exchangers that function as evaporators of the heat-source-side refrigerant. The controller causes the heat-source-side heat exchanger to function as an evaporator of the heat-source-side refrigerant or as a radiator of the heat-source-side refrigerant in accordance with an overall heat load of the plurality of usage units in a state in which the heating operation, or a cooling operation for cooling the aqueous medium by evaporation of the heat-source-side refrigerant in the second usage-side heat exchangers, has been set for each of the usage units, and carries out an operation for balancing the overall heat load of the plurality of usage units.

With this heat pump system, the heat source unit is provided so as to be shared by the plurality of usage units for performing the heating operation of the aqueous medium. Accordingly, the heat source unit can be installed in a shared space of a residential complex or the like. Cooling operation can be carried out because the usage unit has second usage-side heat exchangers for the cooling operation in addition to the first usage-side heat exchangers for the heating operation. Also, with this heat pump system, operation can be carried out with the cooling operation or the heating operation set for each of the usage units.

The heat pump system is thus appropriate for residential complexes or the like because each housing unit or the like can individually carry out cooling operation or heating operation while solving the problems of installation space of the heat source unit and the need for cooling operation.

A heat pump system according to a second aspect of the present invention is the heat pump system according to the first aspect of the present invention, wherein the refrigerant communication tubes have a discharge refrigerant communication tube, a liquid-refrigerant communication tube, and an intake refrigerant communication tube. The discharge refrigerant communication tube is a refrigerant tube for drawing out the heat-source-side refrigerant from a discharge of the heat-source-side compressor to the exterior of the heat source unit. The liquid-refrigerant communication tube is a refrigerant tube for drawing out the heat-source-side refrigerant from the outlet of the heat-source-side heat exchanger functioning as a radiator of the heat-source-side refrigerant to the exterior of the heat source unit, and for introducing the heat-source-side refrigerant from the exterior of the heat source unit to an inlet of the heat-source-side heat exchanger functioning as an evaporator of the heat-source-side refrigerant. The intake refrigerant communication tube is a refrigerant tube for introducing the heat-source-side refrigerant from the exterior of the heat source unit to an intake of the heat-source-side compressor. The discharge refrigerant communication tube is connected to the usage units so that the heat-source-side refrigerant is introduced from the exterior of the usage units to the inlet of the first usage-side heat exchangers. The usage-side heat exchange inlet/outlet connection tubes for connecting the outlet of the heat-source-side refrigerant of the first usage-side heat exchangers and the inlet of the heat-source-side refrigerant of the second usage-side heat exchangers are provided inside the usage units. The liquid-refrigerant communication tube is connected to the usage units so as to introduce the heat-source-side refrigerant from the exterior of the usage units to the usage-side heat exchange inlet/outlet connection tubes, and introduce the heat-source-side refrigerant from the exterior of the usage units to the usage-side heat exchange inlet/outlet connection tubes.

With this heat pump system, the cooling operation and the heating operation can be simultaneously carried out in each of the usage units because the heat source unit and the plurality of the usage units are connected by three refrigerant communication tubes (the discharge refrigerant communication tube, the liquid-refrigerant communication tube, and the intake refrigerant communication tube). It is therefore possible to simultaneously carry out indoor air-cooling by the cooling operation and hot-water supply by the heating operation in each of the usage units. Accordingly the heat pump system is effective in residential complexes or the like in which hot-water supply and air cooling are simultaneously carried out in each housing unit or the like.

With this heat pump system, there is a single connection between the liquid-refrigerant communication tube and each of the usage units because the first usage-side heat exchangers and the second usage-side heat exchangers are connected to the liquid-refrigerant communication tube via the usage-side inlet/outlet connection tubes. Therefore, with this heat pump system, the refrigerant tubes can be readily mounted between the heat source unit and the usage units.

In this manner, with this heat pump system, mounting the refrigerant tubes between the heat source unit and the usage units can be facilitated while simultaneously carrying out the cooling operation and the heating operation in individual usage units.

A heat pump system according to a third aspect of the present invention is the heat pump system according to the first or second aspect of the present invention, wherein cool/warm water switching mechanisms are disposed inside of the usage units. The cool/warm water switching mechanisms are mechanisms for allowing selective interchange of the aqueous medium heated by the heating operation or the aqueous medium cooled by the cooling operation, between aqueous medium usage units disposed outside the usage units.

With this heat pump system, there are two aqueous medium-tube systems, i.e., a system of aqueous medium tubes through which flows the aqueous medium heated by the heating operation using the first usage-side heat exchangers, and a system of aqueous medium tubes through which flows the aqueous medium cooled by the cooling operation using the second usage-side heat exchangers.

In the configuration in which these two aqueous medium tube systems are drawn out to the exterior of the usage units and connected to the aqueous medium usage apparatuses, there is a problem in that the mounting of the aqueous medium tubes between the usage units and the aqueous medium usage apparatuses becomes complicated.

In view of this problem, this heat pump system has cool/warm water switching mechanisms disposed inside the usage units, as described above, which allows selective interchange of the aqueous medium heated by the heating operation or the aqueous medium cooled by the cooling operation, between the aqueous medium usage units.

With this heat pump system, it is therefore possible to facilitate mounting of the aqueous medium tubes between the usage units and the aqueous medium usage apparatuses because a system having a single shared aqueous medium tube is used in place of a system having two aqueous medium tubes connected between the usage units and the aqueous medium usage apparatuses.

A heat pump system according to a fourth aspect of the present invention is the heat pump system according to the first to third aspects of the present invention, wherein the usage units are capable of simultaneously carrying out the heating operation and the cooling operation.

With this heat pump system, since the usage units are capable of simultaneously carrying out the heating operation and the cooling operation, it is possible to, e.g., simultaneously carry out indoor air cooling by the cooling operation and hot-water supply by the heating operation. Accordingly, this heat pump system is effective in residential complexes or the like in which hot-water supply and air cooling may be carried out simultaneously.

A heat pump system according to a fifth aspect of the present invention is the heat pump system according to the fourth aspect of the present invention, further comprising hot-water storage tanks for storing the aqueous medium heated by the heating operation or the aqueous medium heated by heat exchange with the aqueous medium heated by the heating operation. The controller carries out the heating operation in a case that the hot-water storage temperatures, which are the temperatures of the aqueous medium stored in the hot-water storage tank during the cooling operation, have reached or fallen below predetermined hot-water storage temperature settings.

With this heat pump system, the heating operation is carried out when the hot-water storage temperatures have fallen below predetermined hot-water storage temperature settings or lower during the cooling operation. Therefore, the hot-water storage temperatures can be kept at the predetermined hot-water storage temperature settings or higher while making effective use of the heat obtained by the heat-source-side refrigerant by cooling the aqueous medium in the cooling operation.

A heat pump system according to a sixth aspect of the present invention is the heat pump system according to the fifth aspect of the present invention, wherein the hot-water storage tanks are disposed inside the usage units.

With this heat pump system, it is possible to do away with the onsite work of connecting the aqueous medium tubes between the usage units and the hot-water storage tanks, and the mounting of the aqueous medium tubes can be facilitated because the hot-water storage tanks are disposed inside the usage units.

A heat pump system according to a seventh aspect of the present invention is the heat pump system according to any of the first to sixth aspects of the present invention, wherein the usage units further have usage-side compressors and refrigerant/water heat exchangers. The usage-side compressors are compressors for compressing a usage-side refrigerant. The refrigerant/water heat exchangers are heat exchangers for heating the aqueous medium by heat exchange between the usage-side refrigerant and the aqueous medium. The usage-side compressors, the refrigerant/water heat exchangers, and the first usage-side heat exchangers constitute usage-side refrigerant circuits. The usage-side refrigerant circuits can be operated to cause the refrigerant/water heat exchangers to function as radiators of the usage-side refrigerant, and the first usage-side heat exchangers to function as evaporators of the usage-side refrigerant and as radiators of the heat-source-side refrigerant during the heating operation.

With this heat pump system, the aqueous medium can be heated by a dual refrigerant cycle by a heat-source-side refrigerant circuit and usage-side refrigerant circuits during the heating operation. A high-temperature aqueous medium can thereby be obtained during the heating operation.

A heat pump system according to an eighth aspect of the present invention is the heat pump system according to the seventh aspect of the present invention, wherein the controller varies the operating capacity of the usage-side compressors in a stepwise fashion in the case that the operating capacity of the usage-side compressors is to be varied during the heating operation.

With this heat pump system, sound related to operation changes when the operating capacity of the usage-side compressors is rapidly changed can be noisy to residents or the like depending on the installation location of each housing unit or the like, because usage units having usage-side compressors are provided to each housing unit or the like of a residential complex.

In view of such a possibility, in this heat pump system, the operating capacity of the usage-side compressors is varied in a stepwise fashion in the case that the operating capacity of the usage-side compressors is to be varied during heating operation.

Therefore, in this heat pump system, the sound of operating changes of the usage-side compressors can be kept as quiet as possible.

A heat pump system according to a ninth aspect of the present invention is the heat pump system according to any of the first to eighth aspects of the present invention, wherein usage-side heat exchanger outlet on/off valves, which are shut off when the cooling operation is not carried out and are open when the cooling operation is carried out, are provided to the outlets of the heat-source-side refrigerant of the second usage-side heat exchangers.

The heat-source-side evaporation temperature is the temperature that corresponds to the saturation temperature of the heat-source-side refrigerant in the heat-source-side heat exchangers functioning refrigerant evaporators, and is liable to drop to a very low level in the case that the outside air temperature is low and the heat-source-side heat exchangers functioning as evaporators of the heat-source-side refrigerant are present. Therefore, the heat-source-side refrigerant inside the second usage-side heat exchangers drops to a low temperature, and the refrigerant is cooled and is liable to freeze when cooling operation is not carried out.

In view of this situation, with this heat pump system, usage-side heat exchanger outlet on/off valves, which are shut off when the cooling operation is not carried out and are open when the heating operation is carried out, are provided to the outlets of the heat-source-side refrigerant of the second usage-side heat exchangers, as described above.

The heat-source-side refrigerant of the second usage-side heat exchangers can be prevented from reaching a low temperature when cooling operation is not carried out, and freezing of the aqueous medium can thereby be suppressed.

A heat pump system according to a tenth aspect of the present invention is the heat pump system according to any of the first to ninth aspects of the present invention, wherein the controller computes target heat-source-side evaporation temperatures, which are the target values of the saturation temperatures of the heat-source-side refrigerant in the second usage-side heat exchangers of the usage units carrying out the cooling operation, on the basis of target temperatures of the aqueous medium required in the usage units carrying out the cooling operation, in the case that the plurality of usage units are carrying out the cooling operation; and controls the operating capacity of the heat-source-side compressors so that a heat-source-side evaporation temperature that corresponds to the saturation temperature of the heat-source-side refrigerant in the intake of the heat-source-side compressor becomes the minimum value among the plurality of target heat-source-side evaporation temperatures.

With this heat pump system, the target temperature of the aqueous medium required in each usage unit may be different in the case that a plurality of usage units are carrying out cooling operation because the usage units are individually operated in each housing unit or the like of a residential complex.

As a result, the efficiency of operations becomes unnecessarily low depending on the operating conditions of the plurality of usage units when cooling operation is carried out based on the lowest target temperature predicted in all the usage units.

In view of the above, with this heat pump system, the target heat-source-side evaporation temperatures of the usage units carrying out cooling operation are computed based on the target temperature of the aqueous medium required in the usage units carrying out the cooling operation, and the operating capacity of the heat-source-side compressor is controlled so that the heat-source-side evaporation temperature becomes the minimum value among the plurality of target heat-source-side evaporation temperatures, as described above. Therefore, with this heat pump system, cooling operation is carried out based on the lowest target temperature among the target temperatures of the aqueous medium required in the usage units carrying out the cooling operation.

With this heat pump system, cooling operation at unnecessarily low efficiency can be suppressed because cooling operation is not carried out based on an unnecessarily low target temperature.

A heat pump system according to an eleventh aspect of the present invention is the heat pump system according to any of the first to tenth aspects of the present invention, wherein the controller computes the target heat-source-side condensing temperatures, which are the target values of the saturation temperature of the heat-source-side refrigerant in the first usage-side heat exchangers of the usage units carrying out the heating operation, on the basis of target temperatures of the aqueous medium required in the usage units carrying out the heating operation, in the case that the plurality of usage units are carrying out the heating operation; and controls the operating capacity of the heat-source-side compressors so that a heat-source-side condensing temperature that corresponds to the saturation temperature of the heat-source-side refrigerant in the discharge of the heat-source-side compressor becomes the maximum value among the plurality of target heat-source-side condensing temperatures.

With this heat pump system, the target temperature of the aqueous medium required in each usage unit may be different in the case that a plurality of usage units are carrying out heating operation, because the usage units are individually operated in each housing unit or the like of a residential complex.

As a result, the efficiency of operations become unnecessarily low depending on the operating conditions of the plurality of usage units when heating operation is carried out based on the highest target temperature predicted in all the usage units.

In view of the above, with this heat pump system, the target heat-source-side condensing temperature of the usage units carrying out cooling operation is computed based on the target temperature of the aqueous medium required in the usage units carrying out the heating operation, and the operating capacity of the heat-source-side compressors is controlled so that the heat-source-side condensing temperature becomes the maximum value among the plurality of target heat-source-side condensing temperatures, as described above. Therefore, with this heat pump system, heating operation is carried out based on the highest target temperature among the target temperatures of the aqueous medium required in the usage units carrying out the heating operation.

With this heat pump system, heating operation at unnecessarily low efficiency can be minimized because heating operation is not carried out based on an unnecessarily high target temperature.

DESCRIPTION OF EMBODIMENTS

<Configuration>

—Overall Configuration—

Figure 1:
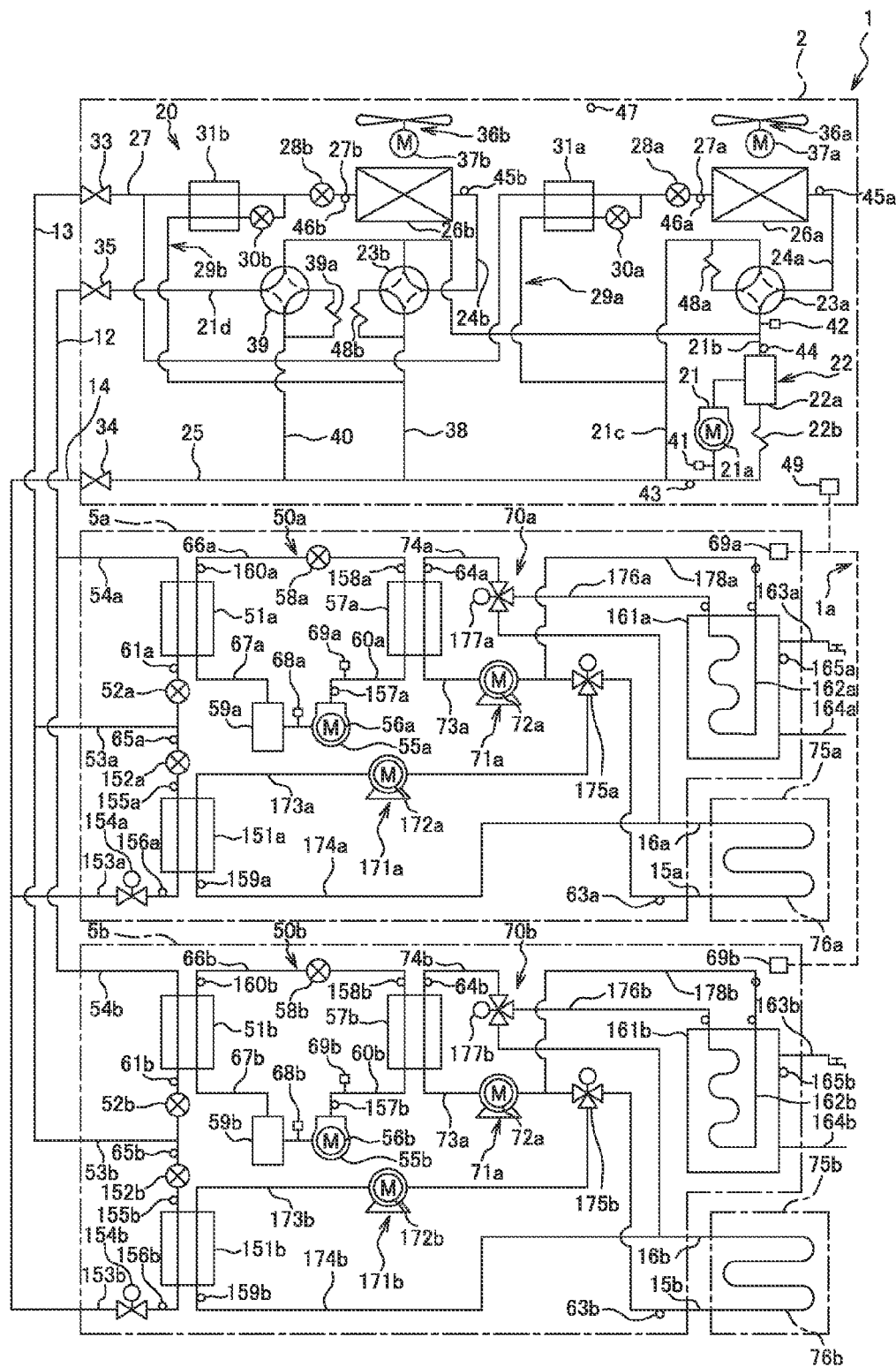
FIG. 1 is a schematic structural diagram of a heat pump system according to an first embodiment of the present invention.

FIG. 1 is a schematic structural diagram of a heat pump system 1 according to an first embodiment of the present invention. The heat pump system 1 is an apparatus capable of air-cooling operation (cooling operation) and air-warming operation or hot-water supply operation (heating operation) using a vapor compression heat pump cycle.

The heat pump system 1 mainly has a heat source unit 2, a plurality (two in FIG. 1) of usage units 5a, 5b, a discharge refrigerant communication tube 12, a liquid-refrigerant communication tube 13, an intake refrigerant communication tube 14, aqueous medium air-cooling/air-heating units 75a, 75b (aqueous medium usage apparatuses), and aqueous medium communication tubes 15a, 16a, 15b, 16b. The heat source unit 2 and usage units 5a, 5b are made into a heat-source-side refrigerant circuit 20 by being connected via the refrigerant communication tithes 12, 13, 14. The usage units 5a, 5b constitute usage-side refrigerant circuits 50a, 50b. The usage units 5a, 5b and the aqueous medium air-cooling/air-heating units 75a, 75b are made into aqueous medium circuits 70a, 70b by being connected via the aqueous medium communication tubes 15a, 16a, 15b, 16b. HFC-410A, which is a type of HFC-based refrigerant, is enclosed inside the heat-source-side refrigerant circuit 20 as a heat-source-side refrigerant. HFC-134a, which is a type of HFC-based refrigerant, is enclosed inside the usage-side refrigerant circuits 50a, 50b as a usage-side refrigerant. The usage-side refrigerant is preferably one in which the pressure that corresponds to a saturated gas temperature of 65° C. is a maximum gauge pressure of 2.8 MPa or less, and is more preferably a refrigerant of 2.0 MPa or less from the viewpoint of using a refrigerant that is advantageous for a high-temperature refrigeration cycle. HFC-134a is a type of refrigerant having such saturation pressure characteristics. Water is circulated as the aqueous medium in the aqueous medium circuits 70a, 70b.

—Heat Source Unit—

The heat source unit 2 is disposed outdoors e.g. on the roof or the like of buildings and residential complexes). The heat source unit 2 is connected to the usage units 5a, 5b via the refrigerant communication tubes 12, 13, 14 and constitutes a portion of the heat-source-side refrigerant circuit 20.

The heat source unit 2 mainly has a heat-source-side compressor 21, an oil separation mechanism 22, a first heat-source-side switching mechanism 23a, a second heat-source-side switching mechanism 23b, a first heat-source-side heat exchanger 26a, a second heat-source-side heat exchanger 26b, a first heat-source-side expansion valve 28a, a second heat-source-side expansion valve 28b, a first intake return tube 29a, a second intake return tube 29b, a first subcooler 31a, a second subcooler 31b, a liquid-side closing valve 33, an intake-side closing valve 34, a discharge-side closing valve 35, and a third heat-source-side switching mechanism 39.

The heat-source-side compressor 21 is a mechanism for compressing the heat-source-side refrigerant. In this configuration, the heat-source-side compressor 21 has a rotary element, scroll element, or other type of positive displacement compression element (not shown) accommodated in a casing (not shown), and the compression element is a hermetic compressor driven by a heat-source-side compressor motor 21a accommodated in the same casing. The rotational speed (i.e., operational frequency) of the heat-source-side compressor motor 21a can be varied by using an inverter device (not shown)), whereby the capacity of the heat-source-side compressor 21 can be controlled.

The oil separation mechanism 22 is a mechanism for separating and returning the refrigeration machine oil contained in the heat source refrigerant discharged from the heat-source-side compressor 21 to the heat-source-side compressor 21. The oil separation mechanism 22 mainly has an oil separator 22a provided to a heat-source-side discharge tube 21b of the heat-source-side compressor 21, and an oil return tube 22b for connecting the oil separator 22a and a heat-source-side intake tube 21c of the heat-source-side compressor 21. The oil separator 22a is an apparatus for separating the refrigeration machine oil contained in the heat-source-side refrigerant discharged from the heat-source-side compressor 21. The oil return tube 22b has a capillary tube and is a refrigerant tube for returning the refrigeration machine oil separated out from the heat-source-side refrigerant in the oil separator 22a to the heat-source-side intake tube 21c of the heat-source-side compressor 21. A heat-source-side gas-refrigerant tube 25 is connected to the heat-source-side intake tube 21c. The heat-source-side gas-refrigerant tube 25 is a refrigerant tube for introducing heat-source-side refrigerant from the exterior of the heat source unit 2 (more specifically, the intake refrigerant communication tube 14) to the intake of the heat-source-side compressor 21.

The first heat-source-side switching mechanism 23a is a four-way switching valve capable of switching between a first heat-source-side heat-radiation operating state for causing the first heat-source-side heat exchanger 26a to function as a radiator of the heat-source-side refrigerant, and a first heat-source-side evaporation operating state for causing the first heat-source-side heat exchanger 26a to function as an evaporator of the heat-source-side refrigerant. The first heat-source-side switching mechanism 23a is connected to the heat-source-side discharge tube 21b, the heat-source-side intake tube 21c, and a first heat-source-side gas-refrigerant tube 24a connected to the gas side of the first heat-source-side heat exchanger 26a. One of the four ports of the first heat-source-side switching mechanism 23a is in communication with the heat-source-side intake tube 21c by way of a capillary tube 48a, whereby the first heat-source-side switching mechanism 23a functions as a three-way switching valve. The first heat-source-side switching mechanism 23a is capable of switching (corresponding to the first heat-source-side heat-radiation operating state; see the solid lines of the first heat-source-side switching mechanism 23a of FIG. 1) so as to place the heat-source-side discharge tube 21b and the first heat-source-side gas-refrigerant tube 24a in communication. The first heat-source-side switching mechanism 23a is also capable of switching (corresponding to the first heat-source-side evaporation operating state; see the broken lines of the first heat-source-side switching mechanism 23a of FIG. 1) so as to place the first heat-source-side gas-refrigerant tube 24a and the heat-source-side intake tithe 21c in communication. The first heat-source-side switching mechanism 23a is not limited to being a four-way switching valve, but may also be, e.g., a configuration in which a plurality of solenoid valves are used in combination to achieve a function similar to that described above for switching the direction of flow of the heat-source-side refrigerant.

The second heat-source-side switching mechanism 23b is a four-way switching valve capable of switching between a second heat-source-side heat-radiation operating state for causing the second heat-source-side heat exchanger 26b to function as a radiator of the heat-source-side refrigerant, and a second heat-source-side evaporation operating state for causing the second heat-source-side heat exchanger 26b to function as an evaporator of the heat-source-side refrigerant. The second heat-source-side switching mechanism 23b is connected to the heat-source-side discharge tube 21b, the heat-source-side intake tube 21c (more specifically, a communication tube 38 in communication with the heat-source-side gas-refrigerant tube 25 and the heat-source-side intake tube 21c), and a second heat-source-side gas-refrigerant tube 24b connected to the gas side of the second heat-source-side heat exchanger 26b. In other words, the heat-source-side discharge tube 21b is a branching tube connected to the first heat-source-side switching mechanism 23a as well as the second heat-source-side switching mechanism 23b. One of the four ports of the second heat-source-side switching mechanism 23b is in communication with the communication tube 38 by way of a capillary tube 48b, whereby the second heat-source-side switching mechanism 23b functions as a three-way switching valve. The second heat-source-side switching mechanism 23b is capable of switching (corresponding to the second heat-source-side heat-radiation operating state; see the solid lines of the second heat-source-side switching mechanism 23b of FIG. 1) so as to place the heat-source-side discharge tube 21b and the second heat-source-side gas-refrigerant tube 24b in communication. The second heat-source-side switching mechanism 23b is also capable of switching (corresponding to the second heat-source-side evaporation operating state; see the broken lines of the second heat-source-side switching mechanism 23b of FIG. 1) so as to place the second heat-source-side gas-refrigerant tube 24b and the heat-source-side intake tube 21c in communication. The second heat-source-side switching mechanism 23b is not limited to being a four-way switching valve, but may also be, e.g., a configuration in which a plurality of solenoid valves are used in combination to achieve a function similar to that described above for switching the direction of flow of the heat-source-side refrigerant.

The third heat-source-side switching mechanism 39 is a four-way switching valve provided to a heat-source-side discharge branching tube 21d branched from the heat-source-side discharge tube 21b. The third heat-source-side switching mechanism 39 is a four-way switching valve capable of switching between a simultaneous air-cooling/warming operating state for constituting the heat pump system in which the heat source unit 2 is capable of simultaneous air-cooling/warming operation, and an air-cooling/warming-switchable operating state for constituting the heat pump system in which the heat source unit 2 is capable of switching between air-cooling and air-warming operation. The third heat-source-side switching mechanism 39 is connected to the heat-source-side discharge branching tube 21d, the heat-source-side intake tube 21c (more specifically, a communication tube 40 in communication with the heat-source-side gas-refrigerant tube 25 and the heat-source-side intake tube 21c). One of the four ports of the third heat-source-side switching mechanism 39 is in communication with the communication tube 40 by way of a capillary tube 39a, whereby the third heat-source-side switching mechanism 39 functions as a three-way switching valve. The third heat-source-side switching mechanism 39 is capable of switching (corresponding to the simultaneous air-cooling/warming operation state; see the solid lines of the third heat-source-side switching mechanism 39 of FIG. 1) the heat-source-side discharge branching tube 21d from discharge of the heat-source-side compressor 21 and causing the heat-source-side discharge branching tube to function as a refrigerant tube for drawing out the heat-source-side refrigerant to the exterior of the heat source unit 2 (more specifically, the discharge refrigerant communication tube 12), regardless of the switching operation of the first and second heat-source-side switching mechanisms 23a, 23b. The third heat-source-side switching mechanism 39 is capable of switching (corresponding to the air-cooling/warming-switchable operating state; see the broken lines of the third heat-source-side switching mechanism 39 of FIG. 1) the heat-source-side discharge branching tube 21d from discharge of the heat-source-side compressor 21 and causing the heat-source-side discharge branching tube to function as a refrigerant tube for drawing out the heat-source-side refrigerant to the exterior of the heat source unit 2, and as a refrigerant tube for introducing the heat-source-side refrigerant from the exterior of the heat source unit 2 to the intake of the heat-source-side compressor 21, in accordance with the switching operation of the first and second heat-source-side switching mechanisms 23a, 23b. The third heat-source-side switching mechanism 39 is not limited to being a four-way switching valve, but may also be, e.g., a configuration in which a plurality of solenoid valves are used in combination to achieve a function similar to that described above for switching the direction of flow of the heat-source-side refrigerant.

The first heat-source-side heat exchanger 26a is a heat exchanger that functions as a radiator or an evaporator of the heat-source-side refrigerant by exchanging heat between the heat-source-side refrigerant and the outdoor air, a first heat-source-side liquid-refrigerant tube 27a is connected to the liquid side of the first heat-source-side heat exchanger, and the first heat-source-side gas-refrigerant tube 24a is connected to the gas side of the first heat-source-side heat exchanger. The first heat-source-side liquid-refrigerant tube 27a is a refrigerant tube for drawing out the heat-source-side refrigerant from the outlet of the first heat-source-side heat exchanger 26a, which functions as a radiator of the heat-source-side refrigerant, to a heat-source-side liquid-refrigerant junction tube 27. The first heat-source-side liquid-refrigerant tube 27a is a refrigerant tube for introducing the heat-source-side refrigerant from the heat-source-side liquid-refrigerant junction tube 27 to the inlet of the first heat-source-side heat exchanger 26a, which functions as an evaporator of the heat-source-side. The outdoor air for exchanging heat with the heat-source-side refrigerant in a first heat-source-side heat exchanger 26 is fed by a first heat-source-side fan 36a driven by a first heat-source-side fan motor 37a. The rotational speed (i.e., operational frequency) of the first heat-source-side fan motor 37a can be varied by using an inverter device (not shown), whereby the airflow rate of the first heat-source-side fan 36a can be controlled.

The first heat-source-side expansion valve 28a is an electrically driven expansion valve for depressurization or the like of the heat-source-side refrigerant that flows through the first heat-source-side heat exchanger 26a, and is provided to the first heat-source-side liquid-refrigerant tube 27a.

The first intake return tube 29a is a refrigerant tube that branches and returns a portion of the heat-source-side refrigerant that flows through the first heat-source-side liquid-refrigerant tube 27a to the intake of the heat-source-side compressor 21. In this configuration, one end of the first intake return tube is connected to the first heat-source-side liquid-refrigerant tube 27a and the other end is connected to the heat-source-side intake tube 21c. A first intake-return expansion valve 30a capable of opening degree control is provided to the first intake return tube 29a. The first intake-return expansion valve 30a is composed of an electrically driven expansion valve.

The first subcooler 31a is a heat exchanger for exchanging heat between the refrigerant that flows through the first heat-source-side liquid-refrigerant tube 27a and the heat-source-side refrigerant (more specifically, the heat-source-side refrigerant depressurized by the first intake-return expansion valve 30a) that flows through the first intake return tube 29a.

The second heat-source-side heat exchanger 26b is a heat exchanger for functioning as a radiator or an evaporator of the heat-source-side refrigerant by exchanging heat between the heat-source-side refrigerant and the outdoor air, a second heat-source-side liquid-refrigerant tube 27b is connected to the liquid side of the second heat-source-side heat exchanger, and the second heat-source-side gas-refrigerant tube 24b is connected to the gas side of the second heat-source-side heat exchanger. The second heat-source-side liquid-refrigerant tube 27b is a refrigerant tube for drawing out the heat-source-side refrigerant from the outlet of the second heat-source-side heat exchanger 26b, which functions as a radiator of the heat-source-side refrigerant, to the heat-source-side liquid-refrigerant junction tube 27. The second heat-source-side liquid-refrigerant tube 27b is a refrigerant tube for introducing the heat-source-side refrigerant from the heat-source-side liquid-refrigerant junction tube 27 to the inlet of the second heat-source-side heat exchanger 26b, which functions as an evaporator of the heat-source-side refrigerant. In other words, the first heat-source-side liquid-refrigerant tube 27a and the second heat-source-side liquid-refrigerant tube 27b are refrigerant tubes branched from the heat-source-side liquid-refrigerant junction tube 27. The heat-source-side liquid-refrigerant junction tube 27 is a refrigerant tube for drawing out the heat-source-side refrigerant from the junction portion of the first heat-source-side liquid-refrigerant tube 27a and the second heat-source-side liquid-refrigerant tube 27b to the exterior of the heat source unit 2 (more specifically, the liquid-refrigerant communication tube 13). The heat-source-side liquid-refrigerant junction tube 27 is a refrigerant tube for introducing the heat-source-side refrigerant from the exterior of the heat source unit 2 to the junction portion of the first heat-source-side liquid-refrigerant tube 27a and the second heat-source-side liquid-refrigerant tube 27b. The outdoor air for exchanging heat with the heat-source-side refrigerant in the second heat-source-side heat exchanger 26b is fed by a second heat-source-side fan 36b driven by a second heat-source-side fan motor 37b. The rotational speed (i.e., operational frequency) of the second heat-source-side fan motor 37b can be varied by using an inverter device (not shown), whereby the airflow rate of the second heat-source-side fan 36b can be controlled.

The second heat-source-side expansion valve 28b is an electrically driven expansion valve for depressurized or the like of the heat-source-side refrigerant that flows through the second heat-source-side heat exchanger 26b, and is provided to the second heat-source-side liquid-refrigerant tube 27b.

The second intake return tube 29b is a refrigerant tube that branches and returns a portion of the heat-source-side refrigerant that flows through the second heat-source-side liquid-refrigerant tube 27b to the intake of the heat-source-side compressor 21. In this configuration, one end of the second intake return tube is connected to the second heat-source-side liquid-refrigerant tube 27b and the other end is connected to the heat-source-side intake tube 21c. A second intake-return expansion valve 30b capable of opening degree control is provided to the second intake return tube 29b. The second intake-return expansion valve 30b is composed of an electrically driven expansion valve.

The second subcooler 31b is a heat exchanger for exchanging heat between the refrigerant that flows through the second heat-source-side liquid-refrigerant tube 27b and the heat-source-side refrigerant (more specifically, the heat-source-side refrigerant depressurized by the second intake-return expansion valve 30b) that flows through the second intake return tube 29b.

The liquid-side closing valve 33 is a valve provided to the connecting portion between the heat-source-side liquid-refrigerant junction tube 27 and the liquid-refrigerant communication tube 13. The intake-side closing valve 34 is a valve provided to the connecting portion between the heat-source-side gas-refrigerant tube 25 and the intake refrigerant communication tube 14. The discharge-side closing valve 35 is a valve provided to the connecting portion between the heat-source-side discharge branching tube 21d and the discharge refrigerant communication tube 12.

Various types of sensors are provided to the heat source unit 2. Specifically, the heat source unit 2 is provided with a heat-source-side intake pressure sensor 41, a heat-source-side discharge pressure sensor 42, a heat-source-side intake temperature sensor 43, a heat-source-side discharge temperature sensor 44, first and second heat-source-side heat exchange gas-side temperature sensors 45a, 45b, first and second heat-source-side heat exchange liquid-side temperature sensors 46a, 46b, and an outside-air temperature sensor 47. The heat-source-side intake pressure sensor 41 is a pressure sensor for detecting the heat-source-side intake pressure Ps1, which is the pressure of the heat-source-side refrigerant in the intake of the heat-source-side compressor 21. The heat-source-side discharge pressure sensor 42 is a pressure sensor for detecting the heat-source-side discharge pressure Pd1, which is the pressure of the heat-source-side refrigerant in the discharge of the heat-source-side compressor 21. The heat-source-side intake temperature sensor 43 is a temperature sensor for detecting the heat-source-side intake temperature Ts1, which is the temperature of the heat-source-side refrigerant in the intake of the heat-source-side compressor 21. The heat-source-side intake temperature sensor 44 is a temperature sensor for detecting the heat-source-side discharge temperature Td1, which is the temperature of the heat-source-side refrigerant in the discharge of the heat-source-side compressor 21. The first and second heat-source-side heat exchange gas-side temperature sensors 45a, 45b are temperature sensors for detecting the heat-source-side heat exchange gas-side temperatures Thg1, Thg2, which are the temperatures of the refrigerant in the gas side of the first and second heat-source-side heat exchangers 26a, 26b, The first and second heat-source-side heat exchange liquid-side temperature sensors 46a, 46b are temperature sensors for detecting the heat-source-side heat exchange liquid-side temperatures Thl1, Thl2, which are the temperatures of the heat-source-side refrigerant in the liquid side of first and second the heat-source-side heat exchangers 26a, 26b. The outside-air temperature sensor 47 is a temperature sensor for detecting the outside air temperature To. The heat source unit 2 has a heat-source-side controller 49 for controlling the operation of each part constituting the heat source unit 2. The heat-source-side controller 49 has a microcomputer, memory, and the like for controlling the heat source unit 2. The heat-source-side controller 49 is capable of communicating with later-described usage-side controllers 69a, 69b of the usage units 5a, 5b by using control signals or the like.

—Discharge Refrigerant Communication Tube—

The discharge refrigerant communication tube 12 is connected to the heat-source-side discharge branching tube 21d via the discharge-side closing valve 35. The discharge refrigerant communication tube 12 is a refrigerant tube capable of drawing out the heat-source-side refrigerant from the discharge of the heat-source-side compressor 21 to the exterior of the heat source unit 2 even when the first and second heat-source-side switching mechanisms 23a, 23b are in heat-source-side heat-radiation operating state or in a heat-source-side evaporation operating state, in the case that the third heat-source-side switching mechanism 39 is in a simultaneous air-cooling/warming operating state.

—Liquid-refrigerant Communication Tube—

The liquid-refrigerant communication tube 13 is connected to the heat-source-side liquid-refrigerant junction tube 27 via the liquid-side closing valve 33. The liquid-refrigerant communication tube 13 is a refrigerant tube capable of drawing out the heat-source-side refrigerant from the outlet of the first and second heat-source-side heat exchangers 26a, 26b functioning as radiators of the heat-source-side refrigerant to the exterior of the heat source unit 2. when the first and second heat-source-side switching mechanisms 23a, 23b are in a heat-source-side heat-radiation operating state. The liquid-refrigerant communication tube 13 is a refrigerant tube capable of introducing the heat-source-side refrigerant from the exterior of the heat source unit 2 to the inlet of the first and second heat-source-side heat exchangers 26a, 26b functioning as evaporators of the heat-source-side refrigerant when the first and second heat-source-side switching mechanisms 23a, 23b are in a heat-source-side evaporation operating state.

—Intake Refrigerant Communication Tube—

The intake refrigerant communication tube 14 is connected to the heat-source-side gas-refrigerant tube 25 via the intake-side closing valve 34. The intake refrigerant communication tube 14 is a refrigerant tube capable of introducing the heat-source-side refrigerant from the exterior of the heat source unit 2 to the intake of the heat-source-side compressor 21, when the first and second heat-source-side switching mechanisms 23a, 23b are in a heat-source-side heat-radiation operating state or in a heat-source-side evaporation operating state.

—Usage Units—

The usage units 5a, 5b are arranged indoors (e.g., each unit of a residential complex, each section of a building, or the like). The usage units 5a, 5b are connected to the heat source unit 2 via the refrigerant communication tubes 12, 13, 14, and constitute a portion of the heat-source-side refrigerant circuit 20. The usage units 5a, 5b constitute the usage-side refrigerant circuits 50a, 50b. The usage units 5a, 5b are connected to aqueous-medium air-cooling/warming units 75a, 75b via the aqueous medium communication tubes 15a, 16a, 15b, 16b, and constitute a portion of aqueous medium circuits 70a, 70b. The configuration of the usage unit 5b is the same as that of the usage unit 5a. Therefore, only the configuration of the usage unit 5a will be described here. The configuration of the usage unit 5b is the same except that the subscript "b" is used in place of the subscript "a" of the reference numerals of each part of the usage unit 5a, and a description of each part is omitted.

The usage unit 5a mainly has a first usage-side heat exchanger 51a, a first usage-side expansion valve 52a, a second usage-side heat exchanger 151a, a second usage-side expansion valve 152a, a usage-side compressor 55a, a refrigerant/water heat exchanger 57a, a refrigerant/water heat exchange-side expansion valve 58a, a usage-side accumulator 59a, a first circulation pump 71a, a second circulation pump 171a, and an hot-water storage tank 161a.

The first usage-side heat exchanger 51a is a heat exchanger that functions as a radiator of the heat-source-side refrigerant by exchanging heat between the heat-source-side refrigerant and the usage-side refrigerant. A usage-side heat exchange inlet/outlet connection tube 53a is connected to the liquid-side of the flow passage through which the heat-source-side refrigerant of the first usage-side heat exchanger 51a flows, a first usage-side gas-refrigerant tube 54a is connected to the gas side of the flow passage through which the heat-source-side refrigerant of the first usage-side heat exchanger 51a flows. A cascade-side liquid-refrigerant tube 66a is connected to the liquid-side of the flow passage through which the usage-side refrigerant of the first usage-side heat exchanger 51a flows, and a cascade-side gas-refrigerant tube 67a is connected to the gas side of the flow passage through which the usage-side refrigerant of the first usage-side heat exchanger 51a flows. The usage-side heat exchange inlet/outlet connection tube 53a is a refrigerant tube for drawing out the heat-source-side refrigerant from the outlet of the first usage-side heat exchanger 51a functioning as a radiator of the heat-source-side refrigerant to the exterior of the usage unit 5a (more specifically, the liquid-refrigerant communication tube 13). The first usage-side gas-refrigerant tube 54a is a refrigerant tube for introducing the heat-source-side refrigerant from the exterior of the usage unit 5a (more specifically, the gas refrigerant communication tube 14) to the inlet of the first usage-side heat exchanger 51a functioning as a radiator of the heat-source-side refrigerant. The refrigerant/water heat exchanger 57a is connected to the cascade-side liquid-refrigerant tube 66a, and the usage-side compressor 55a is connected to the cascade-side gas-refrigerant tube 67a.

The first usage-side expansion valve 52a is an electrically driven expansion valve capable of varying the flow rate of the heat-source-side refrigerant that flows through the first usage-side heat exchanger 51a by controlling the opening degree, and is provided to the usage-side heat exchange inlet/outlet connection tube 53a.

The usage-side compressor 55a is a mechanism for compressing the usage-side refrigerant. In this configuration, the usage-side compressor 55a is a hermetic compressor having rotary element, scroll element, or other type of positive displacement compression element (not shown) accommodated in a casing (not shown), and is driven by a usage-side compression motor 56a. accommodated in the same casing. The rotational speed (i.e., operational frequency) of the usage-side compression motor 56a can be varied by using an inverter device (not shown), whereby the capacity of the usage-side compressor 55a can he controlled. A cascade-side discharge tube 60a is connected to the discharge of the usage-side compressor 55a, and the cascade-side gas-refrigerant tube 67a is connected to the intake of the usage-side compressor 55a.

The refrigerant/water heat exchanger 57a is a heat exchanger that functions as a radiator of the usage-side refrigerant by exchanging heat between the usage-side refrigerant and the aqueous medium. The cascade-side liquid-refrigerant tube 66a is connected to the liquid side of the flow passage through which the usage-side refrigerant of the refrigerant/water heat exchanger 57a flows, and the cascade-side gas-refrigerant tube 67a is connected to the gas side of the flow passage through which the usage-side refrigerant of the refrigerant/water heat exchanger 57a flows. A first usage-side water inlet tube 73a is connected to the inlet side of the flow passage through which the aqueous medium of the refrigerant/water heat exchanger 57a flows, and a first usage-side water outlet tube 74a is connected to the outlet side of the flow passage through which the aqueous medium of the refrigerant/water heat exchanger 57a flows. The first usage-side water inlet tube 73a is an aqueous medium tube for introducing the aqueous medium from the exterior of the usage unit 5a (more specifically, an aqueous medium communication tube 15a) to the inlet of the refrigerant/water heat exchanger 57a functioning as a heater of the aqueous medium. The first usage-side water outlet tube 74a is an aqueous medium tube for drawing out the aqueous medium from the outlet of the refrigerant/water heat exchanger 57a functioning as a heater of the aqueous medium to the exterior of the usage unit 5a (more specifically, an aqueous medium communication tube 16a).

The refrigerant/water heat exchange-side expansion valve 58a is an electrically driven expansion valve capable of varying the flow rate of the usage-side refrigerant that flows through the refrigerant/water heat exchanger 57a by controlling the opening degree, and is provided to the cascade-side liquid-refrigerant tube 66a.

The usage-side accumulator 59a is provided to the cascade-side gas-refrigerant tube 67a, and is a container for temporarily collecting the usage-side refrigerant that circulates through the usage-side refrigerant circuit 50a before being drawn from the cascade-side gas-refrigerant tube 67a into the usage-side compressor 55a.

Thus, the usage-side refrigerant circuit 50a has a configuration in which the usage-side compressor 55a, the refrigerant/water heat exchanger 57a, the refrigerant/water heat exchange-side expansion valve 58a, the first usage-side heat exchanger 51a, and the usage-side accumulator 59a are connected via the refrigerant tubes 60a, 66a.

The first circulation pump 71a is a mechanism for increasing the pressure of the aqueous medium, In this configuration, is a pump in which a centrifugal or positive-displacement pump element (not shown) is driven by a first circulation pump motor 72a. The first circulation pump 71a is provided to the first usage-side water inlet tube 73a, The rotational speed (i.e., operational frequency) of the first circulation pump motor 72a can be varied by using an inverter device (not shown), whereby the capacity of the first circulation pump 71a can be controlled.

The second usage-side heat exchanger 151a is a heat exchanger that functions as an evaporator of the heat-source-side refrigerant by exchanging heat between the heat-source-side refrigerant and the aqueous medium. The usage-side heat exchange inlet/outlet connection tube 53a is connected to the liquid-side of the flow passage through which the heat-source-side refrigerant of the second usage-side heat exchanger 151a flows, and a second usage-side gas-refrigerant tube 153a is connected to the gas-side of the flow passage through which the heat-source-side refrigerant of the second usage-side heat exchanger 151a flows. In other words, the usage-side heat exchange inlet/outlet connection tube 53a functions as a refrigerant tube for connecting the outlet of the heat-source-side refrigerant of the first usage-side heat exchanger 51a and the inlet of the heat-source-side refrigerant of the second usage-side heat exchanger 151a. Accordingly, the usage-side heat exchange inlet/outlet connection tube 53a is a refrigerant tube for introducing the heat-source-side refrigerant from the exterior of the usage unit 5a (more specifically, the liquid-refrigerant communication tube 13) and/or the outlet of the heat-source-side refrigerant of the first usage-side heat exchanger 51a to the inlet of the second usage-side heat exchanger 151a functioning as a radiator of the heat-source-side refrigerant. A usage-side heat exchanger outlet on/off valve 154a capable of on/off control is provided to the second usage-side gas-refrigerant tube 153a. The usage-side heat exchanger outlet on/off valve 154a is composed of a solenoid valve. A second usage-side water inlet tube 173a is connected to the inlet side of the flow passage through which the aqueous medium of the second usage-side heat exchanger 151a flows, and a second usage-side water outlet tube 174a is connected to the outlet side of the flow passage through which the aqueous medium of the second usage-side heat exchanger 151a flows.

The second circulation pump 171a is a mechanism for increasing the pressure of the aqueous medium, and in this configuration, is a pump in which a centrifugal or positive-displacement pump element (not shown) is driven by a second circulation pump motor 172a. The second circulation pump 171a is provided to the first usage-side water inlet tube 73a. The rotational speed (i.e., the operational frequency) of the second circulation pump motor 172a can be varied by using an inverter device (not shown), whereby the capacity of the second circulation pump 171a can be controlled. The second usage-side water inlet tube 173a branches from a portion further upstream from the first circulation pump 71a of the first usage-side water inlet tube 73a via a cool/warm water switching mechanism 175a. The second usage-side water outlet tube 174a merges with the first usage-side water outlet tube 74a. The cool/warm water switching mechanism 175a is a mechanism for allowing selective interchange of the aqueous medium heated in the refrigerant/water heat exchanger 57a or the aqueous medium cooled in the second usage-side heat exchanger 151a with the aqueous medium air-cooling/warming unit 75a disposed outside of the usage unit 5a. The cool/warm water switching mechanism 175a is a three-way valve.

The second usage-side expansion valve 152a is an electrically driven expansion valve capable of varying the flow rate of the heat-source-side refrigerant that flows through the second usage-side heat exchanger 151a by controlling the opening degree, and is provided to the usage-side heat exchange inlet/outlet connection tube 53a.

The hot-water storage tank 161a is disposed indoors (in this case, inside the usage unit 5a). The hot-water storage tank 161a is a container for storing water as the aqueous medium fed by the hot-water supply. A hot-water supply tube 163a for sending the aqueous medium converted to hot water to a faucet, a shower, or the like is connected to the upper portion of the hot-water storage tank 161a, and a water supply tube 164a for supplementing the aqueous medium consumed by the hot-water supply tube 163a is connected to the lower portion of the hot-water storage tank 161a. A heat exchange coil 162a is disposed inside the hot-water storage tank 161a.

The heat exchange coil 162a is disposed inside the hot-water storage tank 161a. The heat exchange coil 162a is a heat exchanger functioning as a heater of the aqueous medium inside the hot-water storage tank 161a by exchanging heat between the aqueous medium inside the hot-water storage tank 161a and the aqueous medium circulating through the aqueous medium circuit 70a. A hot-water storage tank-side water inlet tube 176a branched from the first usage-side water outlet tube 74a is connected to the inlet of the heat exchange coil 162a. A hot-water storage tank-side water outlet tube 178a that merges with the first usage-side water inlet tube 73a is connected to the outlet of the heat exchange coil 162a. The hot-water storage tank-side water inlet tube 176a branches from the first usage-side water outlet tube 74a via an air-warming/hot-water switching mechanism 177a. The air-warming/hot-water switching mechanism 177a is capable of switching supply of the aqueous medium circulating through the aqueous medium circuit 70a to both the hot-water storage tank 161a and the aqueous medium air cooling/warming unit 75a, or to one of the hot-water storage tank 161a and the aqueous medium air cooling/warming unit 75a. The air-warming/hot-water switching mechanism 177a is composed of a three-way valve. The hot-water storage tank-side water outlet tube 178a merges with the first usage-side water inlet tube 73a between the cool/warm water switching mechanism 175a and the first circulation pump 71a. The hot-water storage tank 161a can thereby store the aqueous medium as warm water, the aqueous medium inside the hot-water storage tank 161a being heated by the aqueous medium heated in the usage unit 5a and circulated through the aqueous medium circuit 70a. In this configuration, the hot-water storage tank 161a is a hot-water storage tank of a type that holds an aqueous medium heated by exchanging heat with an aqueous medium heated in the usage unit 5a, but it is also possible to use a hot-water storage tank of a type that stores an aqueous medium heated in the usage unit 5a.

Various types of sensors are provided to the usage unit 5a. Specifically provided to the usage unit 5a are a first usage-side heat exchange liquid-side temperature sensor 61a, a second usage-side heat exchanger gas-side temperature sensor 156a, a second usage-side liquid-refrigerant temperature sensor 65a, a second usage-side heat exchanger liquid-side temperature sensor 155a, an aqueous medium inlet temperature sensor 63a first aqueous medium outlet temperature sensor 64a, a second aqueous medium outlet temperature sensor 159a, a usage-side intake pressure sensor 68a, a usage-side discharge pressure sensor 69a, a usage-side discharge temperature sensor 157a, a refrigerant/water heat exchange temperature sensor 158a, a cascade-side liquid-refrigerant tube temperature sensor 160a, and a hot-water storage temperature sensor 165a. The first usage-side heat exchange liquid-side temperature sensor 61a is a temperature sensor for detecting a first usage-side heat exchange liquid-side temperature Tul1a, which is the temperature of the heat-source-side refrigerant in the liquid-side of the first usage-side heat exchanger 51a. The second usage-side heat exchanger gas-side temperature sensor 156a is a temperature sensor for detecting a second usage-side heat exchange gas-side temperature Tug2a, which is the temperature of the heat-source-side refrigerant in the gas-side of the second usage-side heat exchanger 151a. The second usage-side liquid-refrigerant tube temperature sensor 65a is a temperature sensor for detecting the temperature Tuv2a of the heat-source-side refrigerant in the upstream side of the second usage-side expansion valve 152a. The second usage-side heat exchanger liquid-side temperature sensor 155a is a temperature sensor for detecting the second usage-side heat exchange liquid-side temperature Tul2a, which is the temperature of the heat-source-side refrigerant in the liquid-side of the second usage-side heat exchanger 151a. The aqueous medium inlet temperature sensor 63a is a temperature sensor for detecting the aqueous medium inlet temperature Twra, which is the temperature of the aqueous medium in the inlet of the refrigerant/water heat exchanger 57a and the inlet of the second usage-side heat exchanger 151a. The first aqueous medium outlet temperature sensor 64a is a temperature sensor for detecting the aqueous medium outlet temperature Twl1a, which is the temperature of the aqueous medium at the outlet of the refrigerant/water heat exchanger 57a. The second aqueous medium outlet temperature sensor 159a is a temperature sensor for detecting the aqueous medium outlet temperature Twl2a, which is the temperature of the aqueous medium at the outlet of the second usage-side heat exchanger 151a. The usage-side intake pressure sensor 68a is a pressure sensor for detecting the usage-side intake pressure Ps2a, which is the pressure of the usage-side refrigerant in the intake of the usage-side compressor 55a. The usage-side discharge pressure sensor 69a is a pressure sensor for detecting the usage-side discharge pressure Pd2a, which is the pressure of the usage-side refrigerant in the discharge of the usage-side compressor 55a. The usage-side discharge temperature sensor 157a is a temperature sensor for detecting the usage-side discharge temperature Td2a, which is the temperature of the usage-side refrigerant in the discharge of the usage-side compressor 55a. The refrigerant/water heat exchange temperature sensor 158a is a temperature sensor for detecting the cascade-side refrigerant temperature Tpl1a, which is the temperature of the usage-side refrigerant in the liquid-side of the refrigerant/water heat exchanger 57a. The cascade-side liquid refrigerant tube temperature sensor 160a is a temperature sensor for detecting the temperature Tpl2a of the usage-side refrigerant in the liquid-side of the first usage-side heat exchanger 51a. The hot-water storage temperature sensor 165a is a temperature sensor for detecting the hot-water storage temperature Twha, which is the temperature of the aqueous medium stored in the hot-water storage tank 161a. The usage unit 5a has a usage-side controller 69a for controlling the operation of each part constituting the usage unit 5a. The usage-side controller 69a has a microcomputer, memory, and the like for controlling the usage unit 5a. The usage-side controller 69a is capable of communicating with a remote control (not shown) and between the heat source unit 2 and the heat-source-side controller 49 by using control signals or the like.

—Aqueous-Medium Air-cooling/Warming Unit—

The aqueous-medium air-cooling/warming units 75a, 75b (aqueous medium usage apparatuses) are arranged indoors (e.g., each unit of a residential complex, each section of a building, or the like). The aqueous-medium air-cooling/warming units 75a, 75b are connected to the usage units 5a, 5b via the aqueous medium communication tubes 15a, 16a, and constitute a portion of the aqueous medium circuits 70a, 70b. The configuration of the aqueous-medium air-cooling/warming unit 75b is the same as the configuration of the aqueous-medium air-cooling/warming unit 75a. Therefore, only the configuration of the aqueous-medium air-cooling/warming unit 75a is described herein, and the configuration of the aqueous-medium air-cooling/warming unit 75b is the same except that the subscript "b" is used in place of the subscript "a" of the reference numerals of each part of the aqueous-medium air-cooling/warming unit 75a, and a description of each part is omitted.

The aqueous-medium air-cooling/warming unit 75a mainly has a heat exchange panel 76a, and constitutes a radiator, a floor air-cooling/warming panel, or the like.

The heat exchange panel 76a is provided along the walls or the like indoors in the case of a radiator, and is provided under the floor or the like indoors in the case of a floor air-cooling/warming panel. The heat exchange panel 76a is a heat exchanger that functions as a radiator or heater of the aqueous medium that circulates through an aqueous medium circuit 70a, the aqueous medium communication tube 16a is connected to the inlet thereof, and the aqueous medium communication tube 15a. is connected to the outlet thereof.

—Aqueous Medium Communication Tubes—

The aqueous medium communication tube 15a is connected to the first usage-side water inlet tube 73a. The aqueous medium communication tube 15a is an aqueous medium tube capable of introducing the aqueous medium from the exterior of the usage unit 5a (more specifically the aqueous-medium air-cooling/warning unit 75a) to the inlet of the first usage-side heat exchanger 51a that functions as a heater for the aqueous medium or to the inlet of the second usage-side heat exchanger 151a that functions as a cooler for the aqueous medium.

The aqueous medium communication tube 16a is connected to first usage-side water outlet tube 74a. The aqueous medium communication tube 16a is an aqueous medium tube capable of drawing out, the aqueous medium from the outlet of the first usage-side heat exchanger 51a that functions as a heater for the aqueous medium or the outlet of the second usage-side heat exchanger 151a that functions as a cooler for the aqueous medium to the exterior of the usage unit 5a (more specifically, the aqueous-medium air-cooling/warming unit 75a).

The controller 1a for controlling the operation of the heat pump system 1 is composed of the usage-side controllers 69a, 69b and the heat-source-side controller 49 and performs the operations and various controls described below.

<Operation>

Next, the operation of the heat pump system 1 will be described.

The heat pump system 1 can operate in a full air-warming operation mode, a simultaneous air-cooling/warming operation mode, and a full air-cooling operation mode. The full air-warming operation mode is an operating mode for performing only air-warming operation (and/or hot-water supply operation) in a state in which only usage units set for air-warming operation or hot-water supply operation (heating operation) exist. The simultaneous air-cooling/warming operation mode is an operation mode for performing a mixed air-cooling and the air-warming operation (and/or hot-water supply operation) in a state in which one of the usage units 5a, 5b is set for air-cooling operation (cooling operation) and the other of the usage units 5a, 5b is set for air-warming operation (heating operation) or for hot-water supply operation (heating operation), or in state in which at least one of the usage units 5a, 5b is set for air-cooling/hot-water supply operation for carrying out simultaneous air-cooling operation and hot-water supply operation. The full air-cooling operation mode is an operating mode for performing only air-cooling operation in a state in which only usage units set for air-cooling operation (cooling operation) exist. The simultaneous air-cooling/warming operation mode can be divided into a simultaneous air-cooling/warming operation mode (mainly evaporation) and a simultaneous air-cooling/warming operation mode (mainly heat radiation) in accordance with the overall heat load (the total of the air-cooling load and the air-warming load) of the usage units 5a, 5b. The simultaneous air-cooling/warming operation mode (mainly evaporation) is an operating mode in which a mixed air-cooling and air-warming operation (and/or hot water supply operation) of the usage units 5a, 5b is performed, and in which the heat-source-side refrigerant is sent from the usage units 5a, 5b to the heat source unit 2 via the liquid-refrigerant communication tube 13. The simultaneous air-cooling/warming operation mode (mainly heat radiation) is an operating mode in which a mixed air-cooling and air-warming operation(and/or hot-water supply operation) of the usage units 5a, 5b is performed, and in which the heat-source-side refrigerant is sent from the heat source unit 2 to the usage units 5a, 5b via the liquid-refrigerant communication tube 13.

—Full Air-warming Operation Mode—

In the case that only air-warming operation (and/or hot-water supply operation) of the usage units 5a, 5b is to be performed, the first and second heat-source-side switching mechanisms 23a, 23b are switched to the heat-source-side evaporation operating state (the state of the first and second heat-source-side switching mechanisms 23a, 23b indicated by the broken lines in FIG. 1) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 1). The first and second intake-return expansion valves 30a, 30b are switched to be closed. The second usage-side expansion valves 152a, 152b and the usage-side heat exchanger outlet on/off valves 154a, 154b are switched to be closed. The cool/warm water switching mechanisms 175a, 175b and air-warming/hot-water switching mechanisms 177a, 177b are switched to a state in which the aqueous medium heated in the refrigerant/water heat exchangers 57a, 57b is fed to the aqueous-medium air-cooling/warming units 75a, 75b and/or the hot-water storage tanks 161a, 161b. In this description, all of the usage units 5a, 5b are set for air-warming operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. The high-pressure heat-source-side refrigerant from which the refrigeration machine oil has been separated out is sent from the heat source unit 2 to the discharge refrigerant communication tube 12 by way of the heat-source-side discharge branching tube 21d, the third heat-source-side switching mechanism 39, and the discharge-side closing valve 35.

The high-pressure heat-source-side refrigerant sent to the discharge refrigerant communication tube 12 is branched into two flows and sent to the usage units 5a, 5b.

The high-pressure heat-source-side refrigerant sent to the usage units 5a, 5b is sent to the first usage-side heat exchangers 51a, 51b via the first usage-side gas-refrigerant tubes 54a, 54b. The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent from the usage units 5a, 5b and merged with the liquid-refrigerant communication tube 13 by way of the first usage-side expansion valves 52a, 52b and the usage-side heat exchange inlet/outlet connection tubes 53a, 53b.

The heat-source-side refrigerant sent to the liquid-refrigerant communication tube 13 is sent to the heat source unit 2. The heat-source-side refrigerant sent to the heat source unit 2 is sent to the subcoolers 31a, 31b by way of the liquid-side closing valve 33 and the heat-source-side liquid-refrigerant junction tube 27. The heat-source-side refrigerant sent to the subcoolers 31a, 31b is sent to the heat-source-side expansion valves 28a, 28b without undergoing heat exchange because the heat-source-side refrigerant does not flow to the intake return tubes 29a, 29b. The heat-source-side refrigerant sent to the heat-source-side expansion valves 28a, 28b is depressurized in the heat-source-side expansion valves 28a, 28b to form a low-pressure gas-liquid two-phase state, and is then sent to the heat-source-side heat exchangers 26a, 26b by way of the heat-source-side liquid-refrigerant tubes 27a, 27b. The low-pressure heat-source-side refrigerant sent to the heat-source-side heat exchangers 26a, 26b is evaporated in the heat-source-side heat exchangers 26a, 26b by exchanging heat with outside air fed by the heat-source-side fans 36a, 36b. The low-pressure heat-source-side refrigerant evaporated in the heat-source-side heat exchangers 26a, 26b is again taken into the heat-source-side compressor 21 by way of the heat-source-side gas-refrigerant tubes 24a, 24h, the heat-source-side switching mechanisms 23a, 23b, and the heat-source-side intake tube 21c.

On the other hand, in the usage-side refrigerant circuits 50a, 50b, the low-pressure usage-side refrigerant in the refrigeration cycle circulating through the usage-side refrigerant circuits 50a, 50b is heated and evaporated by heat radiation of the heat-source-side refrigerant in the first usage-side heat exchangers 51a, 51b. The low-pressure usage-side refrigerant evaporated in the first usage-side heat exchangers 51a, 51b is sent to the usage-side accumulators 59a, 59b by way of the cascade-side gas-refrigerant tubes 67a, 67b. The low-pressure usage-side refrigerant sent to the usage-side accumulators 59a, 59b is taken into the usage-side compressors 55a, 55b, compressed to a high pressure in the refrigeration cycle, and thereafter discharged to the cascade-side discharge tubes 60a, 60b. The high-pressure usage-side refrigerant discharged to the cascade-side discharge tubes 60a, 60b is sent to the refrigerant/water heat exchangers 57a, 57b. The high-pressure usage-side refrigerant sent to the refrigerant/water heat exchangers 57a, 57b radiates heat in the refrigerant/water heat exchangers 57a, 57b by exchanging heat with the aqueous medium being circulated through the aqueous medium circuits 70a, 70b by the first circulation pumps 71a, 71b. The high-pressure usage-side refrigerant which has radiated heat in the refrigerant/water heat exchangers 57a, 57b is depressurized in the refrigerant/water heat exchange expansion valves 58a, 58b to form a low-pressure gas-liquid two-phase state, and is again sent to the first usage-side heat exchangers 51a, 51b by way of the cascade-side liquid-refrigerant tubes 66a, 66b.

In the aqueous medium circuits 70a, 70b, the aqueous medium circulating through the aqueous medium circuits 70a, 70b is heated by heat radiation from the heat-source-side refrigerant in the refrigerant/water heat exchangers 57a, 57b. The aqueous medium heated in the refrigerant/water heat exchangers 57a, 57b is sent by the first circulation pumps 71a, 71b from the usage units 5a, 5b to the aqueous medium communication tubes 16a, 16b by way of the first usage-side water outlet tubes 74a, 74b. The aqueous medium sent to the aqueous medium communication tubes 16a, 16b is sent to the aqueous-medium air-cooling/warming units 75a, 75b. The aqueous medium sent to the aqueous-medium air-cooling/warming units 75a, 75b radiates heat in the heat exchange panels 76a, 76b, whereby the indoor space along the walls or the like is heated and the indoor floor is also heated.

In the case that the usage units 5a, 5b perform hot-water supply operation, the air-warming/hot-water supply switching mechanisms can be switched so that the aqueous medium heated in the refrigerant/water heat exchangers is fed to the hot-water storage tanks in the usage units, which are performing hot-water supply operation. The aqueous medium heated in the refrigerant/water heat exchangers 57a, 57b is thereby fed by the first circulation pumps 71a, 71b to the hot-water storage tanks 161a, 161b by way of the first usage-side water outlet tubes 74a, 74b and hot-water storage tank-side water inlet tubes 176a, 176b. The heat exchange coils 162a, 162b radiate heat and perform heat exchange with the aqueous medium inside the hot-water storage tanks 161a, 161b to heat the aqueous medium inside the hot-water storage tanks 161a, 161b.

In the case that the air-warming operation and hot-water supply operation of the usage units 5a, 5b are simultaneously performed, the air-warming/hot-water supply switching mechanism in the usage units that are performing air-warming operation and hot-water supply operation can be switched so that the aqueous medium heated in the refrigerant/water heat exchangers is fed to the aqueous refrigerant air-cooling/warming units and to the hot-water storage tanks.

In this manner, operation in the full air-warming operation mode is performed in which only air-warming operation (and/or hot-water supply operation) of the usage units 5a, 5b is performed.

—Simultaneous Air-cooling/Warming Operation Mode (Mainly Evaporation)—

In the case of a mixed air-cooling and air-warming operation (and/or hot-water supply operation) of the usage units 5a, 5b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 1), and the other of the heat-source-side switching mechanisms 23a, 23b is switched to the heat-source-side evaporation operating state (the state of the heat-source-side switching mechanisms 23a, 23b indicated by the broken lines in FIG. 1). The third heat-source-side switching mechanism 39 is switched to a simultaneous air-cooling/warming operation state (the state of the third heat-source-side switching mechanism 39 indicated by the solid lines in FIG. 1). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 5a, 5b, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation (and/or hot-water supply operation) among the usage units 5a, 5b, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23a switched to the heat-source-side heat-radiation operating state, the second heat-source-side switching mechanism 23b switched to the heat-source-side evaporation operating state, and the intake-return expansion valve 30b switched to be closed. Described herein is the state in which the usage unit 5a is set for air-cooling operation, and the usage unit 5b is set for air-warming operation.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to a high pressure in the refrigeration cycle, and thereafter discharged to the heat-source-side discharge tube 21b. The refrigeration machine oil is separated out in the oil separator 22a from the high-pressure heat-source-side refrigerant discharged to the heat-source-side discharge tube 21b. The refrigeration machine oil separated out from the heat-source-side refrigerant in the oil separator 22a is returned to the heat-source-side intake tube 21c via the oil return tube 22b. A portion of the high-pressure heat-source-side refrigerant from which the refrigeration machine oil has been separated is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12 by way of the heat-source-side branching tube 21d and the discharge-side closing valve 35. The high-pressure heat-source-side refrigerant sent to the first heat-source-side heat exchanger 26a radiates heat in the first heat-source-side heat exchanger 26a by exchanging heat with outdoor air fed by the first heat-source-side fan 36a. The high-pressure heat-source-side refrigerant which has radiated heat in the first heat-source-side heat exchanger 26a is sent to the first subcooler 31a by way of the first heat-source-side expansion valve 28a. The heat-source-side refrigerant sent to the first subcooler 31a is cooled to a subcooled state by exchanging heat with the heat-source-side refrigerant branched from the first heat-source-side liquid-refrigerant tube 27a to the first intake return tube 29a. The heat-source-side refrigerant that flows through the first intake return tube 29a is returned to the heat-source-side intake tube 21c. The heat-source-side refrigerant cooled in the first subcooler 31a is sent to the heat-source-side liquid-refrigerant junction tube 27 by way of the first heat-source-side liquid-refrigerant tube 27a.

The high-pressure heat-source-side refrigerant sett to the discharge refrigerant communication tube 12. is sent to the usage unit 5b.

The high-pressure heat-source-side refrigerant sent to the usage unit 5b is sent to the first usage-side heat exchanger 51b via the first usage-side gas-refrigerant tube 54b. The high-pressure heat-source-side refrigerant sent to the first usage-side heat exchanger 51b radiates heat in the first usage-side heat exchanger 51b by exchanging heat with the low-pressure usage-side refrigerant in the refrigeration cycle that flows through the usage-side refrigerant circuit 50b. The high-pressure heat-source-side refrigerant which has radiated heat in the first usage-side heat exchanger 51b is sent from the usage unit 5b to the liquid-refrigerant communication tube 13 by way of the first usage-side expansion valve 52b and the usage-side heat exchange inlet/outlet connection tube 53b.

A portion of the heat-source-side refrigerant sent from the usage unit 5b to the liquid-refrigerant communication tube 13 is sent to the usage unit 5a, and the remainder is sent to the heat source unit 2.

The heat-source-side refrigerant sent from the liquid-refrigerant communication tube 13 to the usage unit 5a is sent to the second usage-side expansion valve 152a. The heat-source-side refrigerant sent to the second usage-side expansion valve 152a is depressurized in the second usage-side expansion valve 152a to form a low-pressure gas-liquid two-phase state, and is sent to the second usage-side heat exchanger 151a via the usage-side heat exchange inlet/outlet connection tube 53a. The low-pressure heat-source-side refrigerant sent to the second usage-side heat exchanger 151a evaporates in the second usage-side heat exchanger 151a by exchanging heat with the aqueous medium circulated by the second circulation pump 171a through the aqueous medium circuit 70a. The low-pressure heat-source-side refrigerant evaporated in the second usage-side heat exchanger 151a is sent from the usage unit 5a to the intake refrigerant communication tube 14 by way of the usage-side heat exchanger outlet on/off valve 154a and the second usage-side gas-refrigerant tube 153a.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the liquid-refrigerant communication tube 13 to the heat source unit 2 is sent to the heat-source-side liquid-refrigerant junction tube 27 via the liquid-side closing valve 33, and merges with the heat-source-side refrigerant from the first heat-source-side liquid-refrigerant tube 27a. The liquid-refrigerant merged in the heat-source-side liquid-refrigerant junction tube 27 is sent to the second subcooler 31b via the second heat-source-side liquid-refrigerant tube 27b. The heat-source-side refrigerant sent to the second subcooler 31b is sent to the second heat-source-side expansion valve 28b without undergoing heat exchange because the heat-source-side refrigerant does not flow to the second intake return tube 29b. The heat-source-side refrigerant sent to the second heat-source-side expansion valve 28b is depressurized in the second heat-source-side expansion valve 28b to form a low-pressure gas-liquid two-phase state, and is sent to the second heat-source-side heat exchanger 26b via the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuit 70a, the aqueous medium circulating through the aqueous medium circuit 70a is cooled by evaporation of the heat-source-side refrigerant in the second usage-side heat exchanger 151a. The aqueous medium cooled in the second usage-side heat exchanger 151a is sent from the usage unit 5a to the aqueous medium communication tube 16a by the second circulation pump 171a via the second usage-side water outlet tube 174a and the first usage-side water outlet tube 74a. The aqueous medium sent to the aqueous medium communication tube 16a is sent to the aqueous-medium air-cooling/warming unit 75a. The aqueous medium sent to the aqueous-medium air-cooling/warming unit 75a is heated in the heat exchange panel 76a, whereby the indoor space along the walls or the like is cooled, and the indoor floor is also cooled.

In the aqueous medium circuit 70b, the aqueous medium circulating through the aqueous medium circuit 70b is heated by heat radiation of the heat-source-side refrigerant in the refrigerant/water heat exchanger 57b. The aqueous medium heated in the refrigerant/water heat exchanger 57b is sent by the first circulation pump 71b from the usage unit 5b to the aqueous medium communication tube 16b by way of the first usage-side water outlet tube 74b. The aqueous medium sent to the aqueous medium communication tube 16b is sent to the aqueous-medium air-cooling/warming unit 75b. The aqueous medium sent to the aqueous-medium air-cooling/warming unit 75b radiates heat in the heat exchange panel 76b, whereby the indoor space along the walls or the like is heated, and the indoor floor is also heated.

In the case that the usage units 5a, 5b perform hot-water supply operation, the air-warming/hot-water supply switching mechanism in the usage units that perform hot-water supply operation can be switched so that the aqueous medium heated in the refrigerant/water heat exchangers is fed to the hot-water storage tanks The aqueous medium heated in the refrigerant/water heat exchangers is thereby fed by the first circulation pumps to the hot-water storage tanks by way of the first usage-side water outlet tubes and hot-water storage tank-side water inlet tubes. The heat exchange coils radiate heat and perform heat exchange with the aqueous medium inside the hot-water storage tanks to heat the aqueous medium inside the hot-water storage tanks.

In the case that the air-warming operation and the hot-water supply operation of the usage units 5a, 5b are performed simultaneously, the air-warming/hot-water supply switching mechanism in the usage units that perform air-warming operation and hot-water supply operation can be switched so that the aqueous medium heated in the refrigerant/water heat exchangers is fed to the aqueous medium air cooling/warming units and the hot-water storage tanks.

In this manner, operation is performed in the simultaneous air cooling/warming operation mode (mainly evaporation) for performing a mixed air-cooling and air-warming operation (and/or hot-water supply operation) in a state in which one of the usage units 5a, 5b is set for air-cooling operation, and the other of the usage units 5a, 5b is set for air-warming operation.

It is also possible to set a state in which at least one of the usage units 5a, 5b is set for air-cooling/hot-water supply operation to perform simultaneous cooling operation and hot-water supply operation. In this case, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines of in FIG. 1) in the same manner as described above, and the other of the heat-source-side switching mechanisms 23a, 23b is switched to the heat-source-side evaporation operating state (the state of the heat-source-side switching mechanisms 23a, 23b indicated by the broken lines in FIG. 1). The third heat-source-side switching mechanism 39 is switched to a simultaneous air-cooling/warming operation state (the state of the third heat-source-side switching mechanism 39 indicated by the solid lines in FIG. 1). Among the intake-return expansion valves 30a, 30b, the intake-return expansion valve that corresponds to the heat-source-side switching mechanism switched to the heat-source-side evaporation operation state is switched to be closed. in the usage unit set for air-cooling/hot-water supply operation among the usage units 5a, 5b, the first and second usage-side expansion valves are opened, the usage-side heat exchange outlet on/off valve is opened, the cool/warm water switching mechanism is switched to a state in which the aqueous medium cooled in the second usage-side heat exchangers is fed to the aqueous-medium air-cooling/warming units, and the air-warming/hot-water supply switching mechanism is switched to a state in which the aqueous medium heated in the refrigerant/water heat exchangers is fed to the hot-water storage tanks Described hereinbelow is the state in which all of the usage units 5a, 5b are set for air cooling/hot-water supply operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. A portion of the high-pressure heat-source-side refrigerant from which the refrigeration machine oil has been separated out is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12 by way of the heat-source-side discharge branching tube 21d and the discharge-side closing valve 35. The high-pressure heat-source-side refrigerant sent to the first heat-source-side heat exchanger 26a undergoes heat exchange with outside air fed by the first heat-source-side fan 36a and radiates heat in the first heat-source-side heat exchanger 26a. The high-pressure heat-source-side refrigerant that has radiated heat in the first heat-source-side heat exchanger 26a is sent to the first subcooler 31a by way of the first heat-source-side expansion valve 28a. The heat-source-side refrigerant sent to the first subcooler 31a is cooled so that the heat-source-side refrigerant branched from the first heat-source-side liquid-refrigerant tube 27a to the first intake return tube 29a undergoes heat exchange with the heat-source-side refrigerant and is brought to a subcooled state. The heat-source-side refrigerant that flows through the first intake return tube 29a is returned to the heat-source-side intake tube 21c. The heat-source-side refrigerant cooled in the first subcooler 31a is sent to the heat-source-side liquid-refrigerant junction tube 27 by way of the first heat-source-side liquid-refrigerant tube 27a.

The high-pressure heat-source-side refrigerant sent to the discharge refrigerant communication tube 12 is branched into two flows and sent to the usage units 5a, 5b.

The high-pressure heat-source-side refrigerant sent to the usage units 5a, 5b is sent to the first usage-side heat exchangers 51a, 51b via the first usage-side gas-refrigerant tubes 54a, 54b. The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent to the usage-side heat exchange inlet/outlet connection tubes 53a, 53b by way of the first usage-side expansion valves 52a, 52b. A portion of the heat-source-side refrigerant sent to the usage-side heat exchange inlet/outlet connection tubes 53a, 53b is sent to and merged in the liquid-refrigerant communication tube 13, and the remainder is sent to the second usage-side expansion valves 152a, 152b.

The heat-source-side refrigerant sent to and merged in the liquid-refrigerant communication tube 13 is sent to the heat source unit 2.

The heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b. The low-pressure heat-source-side refrigerant sent to the second usage-side heat exchangers 151a, 151b evaporates in the second usage-side heat exchangers 151a, 151b by exchanging heat with the aqueous medium circulated by the second circulation pumps 171a, 171b through the aqueous medium circuits 70a, 70b. The low-pressure heat-source-side refrigerant evaporated in the second usage-side heat exchangers 115a, 151b is sent from the usage units 5a, 5b to the intake refrigerant communication tube 14 by way of the usage-side heat exchanger outlet off/off valves 154a, 154b and the second usage-side gas-refrigerant tubes 153a, 153b and merged therein.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the liquid-refrigerant communication tube 13 to the heat source unit 2 is sent to the heat-source-side liquid-refrigerant junction tube 27 by way of the liquid-side closing valve 33 and is merged with the heat-source-side refrigerant from the first heat-source-side liquid-refrigerant tube 27a. The liquid refrigerant merged in the heat-source-side liquid-refrigerant junction tube 27 is sent to the second subcooler 31b by way of the second heat-source-side liquid-refrigerant tube 27b. The heat-source-side refrigerant sent to the second subcooler 31b is sent to the second heat-source-side expansion valve 28b without undergoing heat exchange because the heat-source-side refrigerant does not flow to the second intake return tube 29b. The heat-source-side refrigerant sent to the second heat-source-side expansion valve 28b is depressurized in the second heat-source-side expansion valve 28b to form a low-pressure gas-liquid two-phase state, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with the outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the second circulation pumps 171a, 171b from the usage units 5a, 5b to the aqueous medium communication tubes 16a, 16b by way of the second usage-side water outlet tubes 174a, 174b and the first usage-side water outlet tubes 74a, 74b. The aqueous medium sent to the aqueous medium communication tubes 16a, 16b is sent to the aqueous medium air cooling/warming units 75a, 75b. The aqueous medium sent to the aqueous medium air cooling/warming units 75a, 75b is heated in the heat exchange panels 76a, 76b, whereby the indoor space along the walls or the like is cooled, and the indoor floor is also cooled.

In the aqueous medium circuits 70a, 70b, the aqueous medium circulating through the aqueous medium circuits 70a, 70b is heated by the heat radiation of the heat-source-side refrigerant in the refrigerant/water heat exchangers 57a, 57b. The aqueous medium heated in the refrigerant/water heat exchangers 57a, 57b is fed by the first circulation pumps 71a, 71b to the hot-water storage tanks 161a, 161b by way of the first usage-side water outlet tubes 74a, 74b and the hot-water storage tank-side water inlet tubes 176a, 176b. The heat exchange coils 162a, 162b radiate heat and perform heat exchange with the aqueous medium inside the hot-water storage tanks 161a, 161b to heat the aqueous medium inside the hot-water storage tanks 161a, 161b.

In this manner, operation in the simultaneous air cooling/warming operation mode (mainly evaporation) for performing a mixed air-cooling and air-warming operation (and/or hot-water supply operation) is performed in a state in which at least one of the usage units 5a, 5b is set to the air-cooling/hot-water supply operation for simultaneously carrying out air-cooling operation and hot-water supply operation.

—Simultaneous Air-cooling/Warming Operation Mode (Mainly Heat Radiation)—

In the case of a mixed air-cooling and air-warming operation (and/or hot-water supply operation) of the usage units 5a, 5b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 1), and the other of the heat-source-side switching mechanisms 23a, 23b is switched to the heat-source-side evaporation operating state (the state of the heat-source-side switching mechanisms 23a, 23b indicated by the broken lines in FIG. 1). The third heat-source-side switching mechanism 39 is switched to a simultaneous air-cooling/warming operation state (the state of the third heat-source-side switching mechanism 39 indicated by the solid lines in FIG. 1). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 5a, 5b, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation (and/or hot-water supply operation) among the usage units 5a, 5b, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23a switched to the heat-source-side heat-radiation operating state, the second heat-source-side switching mechanism 23b switched to the heat-source-side evaporation operating state, and the intake-return expansion valve 30b switched to be closed. Described herein is the state in which the usage unit 5a is set for air-cooling operation, and the usage unit 5b is set for air-warming operation.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to a high pressure in the refrigeration cycle, and thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c via the oil return tube 22b. A portion of the high-pressure heat-source-side refrigerant from which the refrigeration machine oil has been separated out is sent to the first heat-source-side heat exchanger 26a by way of the the first heat-source-side switching mechanism 23a and the first heat-source-side gas-refrigerant tube 24a, and the remainder is sent from the heat source unit 2 to the discharge refrigerant communication tube 12 by way of the heat-source-side discharge branching tube 21d and the discharge-side closing valve 35. The high-pressure heat-source-side refrigerant sent to the first heat-source-side heat exchanger 26a radiates heat in the first heat-source-side heat exchanger 26a by exchanging heat with the outdoor air fed by the first heat-source-side fan 36a. The high-pressure heat-source-side refrigerant which has radiated heat in the first heat-source-side heat exchanger 26a is sent to the first subcooler 31a by way of the first heat-source-side expansion valve 28a. The heat-source-side refrigerant sent to the first subcooler 31a is cooled to a subcooled state by exchanging heat with the heat-source-side refrigerant branched from the first heat-source-side liquid-refrigerant tube 27a to the first intake return tube 29a. The heat-source-side refrigerant that flows through the first intake return tube 29a is returned to the heat-source-side intake tube 21c. The heat-source-side refrigerant cooled in the first subcooler 31a is sent to the heat-source-side liquid-refrigerant junction tube 27 by way of the first heat-source-side liquid-refrigerant tube 27a. A portion of the high-pressure heat-source-side refrigerant sent to the heat-source-side liquid-refrigerant junction tube 27 is sent to the liquid-refrigerant communication tube 13 by way of the liquid-side closing valve 33, and the remainder is sent to the second heat-source-side liquid-refrigerant tube 27b.

The high-pressure heat-source-side refrigerant sent to the discharge refrigerant communication tube 12 is sent to the usage unit 5b.

The high-pressure heat-source-side refrigerant sent to the usage unit 5b is sent to the first usage-side heat exchanger 51b by way of the first usage-side gas-refrigerant tube 54b. The high-pressure heat-source-side refrigerant sent to the first usage-side heat exchanger 51b radiates heat in the first usage-side heat exchanger 51b by exchanging heat with the low-pressure usage-side refrigerant in the refrigeration cycle that circulates through the usage-side refrigerant circuit 50b. The high-pressure heat-source-side refrigerant which has radiated heat in the first usage-side heat exchanger 51b is sent from the usage units 5a, 5b and merged with the heat-source-side refrigerant sent from the heat source unit 2 to the liquid-refrigerant communication tube 13 by way of the first usage-side expansion valve 52b and the usage-side heat exchange inlet/outlet connection tube 53b.

The heat-source-side refrigerant merged in the liquid-refrigerant communication tube 13 is sent to the usage unit 5a.

The heat-source-side refrigerant sent to the usage unit 5a is sent to the second usage-side expansion valve 152a. The heat-source-side refrigerant sent to the second usage-side expansion valve 152a is depressurized in the second usage-side expansion valve 152a to form a low-pressure gas-liquid two-phase state, and is sent to the second usage-side heat exchanger 151a. by way of the usage-side heat exchange inlet/outlet connection tube 53a. The low-pressure heat-source-side refrigerant sent to the second usage-side heat exchanger 151a evaporates in the second usage-side heat exchanger 151a by exchanging heat with the aqueous medium circulated by the first circulation pump 71a through the aqueous medium circuit 70a. The low-pressure heat-source-side refrigerant evaporated in the second usage-side heat exchanger 151a is sent from the usage unit 5a to the intake refrigerant communication tube 14 by way of the usage-side heat exchanger outlet on/off valve 154a and the second usage-side gas-refrigerant tube 153a.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the heat-source-side liquid-refrigerant junction tube 27 to the second heat-source-side liquid-refrigerant tube 27b is sent to the second subcooler 31b. The heat-source-side refrigerant sent to the second subcooler 31b is sent to the second heat-source-side expansion valve 28b without undergoing heat exchange because the heat-source-side refrigerant does not flow to the second intake return tube 29b. The heat-source-side refrigerant sent to the second heat-source-side expansion valve 28b is depressurized in the second heat-source-side expansion valve 28b to form a low-pressure gas-liquid two-phase, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, the aqueous medium circulating through the aqueous medium circuit 70a is cooled in the aqueous medium circuit 70a by evaporation of the heat-source-side refrigerant in the second usage-side heat exchanger 151a. The aqueous medium cooled in the second usage-side heat exchanger 151a is sent by the second circulation pump 171a from the usage unit 5a to the aqueous medium communication tube 16a by way of the second usage-side water outlet tube 174a and by way of the second usage-side water outlet tube 174a and the first usage-side water outlet tube 74a. The aqueous medium sent to the aqueous medium communication tube 16a is sent to the aqueous-medium air-cooling/warming unit 75a. The aqueous medium sent to the aqueous-medium air-cooling/warming unit 75a is heated in the heat exchange panel 76a, whereby the indoor space along the walls or the like is cooled, and the indoor floor is also cooled.

The aqueous medium circulating through the aqueous medium circuit 70b is heated in the aqueous medium circuit 70b by heat radiation of the heat-source-side refrigerant in the refrigerant/water heat exchanger 57b. The aqueous medium heated in the refrigerant/water heat exchanger 57b is sent by the first circulation pump 71b from the usage unit 5b to the aqueous medium communication tube 16b by way of the first usage-side water outlet tube 74b. The aqueous medium sent to the aqueous medium communication tube 16b is sent to the aqueous-medium air-cooling/warming unit 75b. The aqueous medium sent to the aqueous-medium air-cooling/warming unit 75b is heated in the heat exchange panel 76b, whereby the indoor space along the walls or the like is heated, and the indoor floor is also heated.

In the case that the usage units 5a, 5b perform hot-water supply operation, in the usage units that perform the hot-water supply operation the air-warming/hot-water supply switching mechanisms can he switched so that the aqueous medium heated in the refrigerant/water heat exchangers is fed to the hot-water storage tanks. The aqueous medium heated in the refrigerant/water heat exchangers is thereby fed by the first circulation pumps to the hot-water storage tanks by way of the first usage-side water outlet tubes and hot-water storage tank-side water inlet tubes. The heat exchange coils radiate heat and perform heat exchange with the aqueous medium inside the hot-water storage tanks to heat the aqueous medium inside the hot-water storage tanks.

In the case that the air-warming operation and hot-water supply operation of the usage units 5a, 5b are simultaneously performed, the air-warming/hot-water supply switching mechanism in the usage units that are performing air-warming operation and hot-water supply operation can be switched so that the aqueous medium heated in the refrigerant/water heat exchangers is fed to the aqueous medium air-cooling/warming units and to the hot-water storage tanks.

In this manner, operation is performed in the simultaneous air cooling/warming operation mode (mainly heat radiation) for performing a mixed air-cooling and air-warming operation (and/or hot-water supply operation) in a state in which one of the usage units 5a, 5b is set for air-cooling operation, and the other of the usage units 5a, 5b is set for air-warming operation.

It is also possible to set a state in which at least one of the usage units 5a, 5b is set for air-cooling/hot-water supply operation to perform simultaneous cooling operation and hot-water supply operation. In this case, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines of in FIG. 1) in the same manner as described above, and the other of the heat-source-side switching mechanisms 23a, 23b is switched to the heat-source-side evaporation operating state (the state of the heat-source-side switching mechanisms 23a, 23b indicated by the broken lines in FIG. 1). The third heat-source-side switching mechanism 39 is switched to a simultaneous air-cooling/warming operation state (the state of the third heat-source-side switching mechanism 39 indicated by the solid lines in FIG. 1). Among the intake-return expansion valves 30a, 30b, the intake-return expansion valve that corresponds to the heat-source-side switching mechanism switched to the heat-source-side evaporation operation state is switched to be dosed. in the usage unit set for air-cooling/hot-water supply operation among the usage units 5a, 5b, the first and second usage-side expansion valves are opened, the usage-side heat exchange outlet on/off valve is opened, the cool/warm water switching mechanism is switched to a state in which the aqueous medium cooled in the second usage-side heat exchangers is fed to the aqueous-medium air-cooling/warming units, and the air-warming/hot-water supply switching mechanism is switched to a state in which the aqueous medium heated in the refrigerant/water heat exchangers is fed to the hot-water storage tanks. Described hereinbelow is the state in which all of the usage units 5a, 5b are set for air cooling/hot-water supply operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. A portion of the high-pressure heat-source-side refrigerant from which the refrigeration machine oil has been separated out is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12 by way of the heat-source-side discharge branching tube 2 ld and the discharge-side closing valve 35. The high-pressure heat-source-side refrigerant sent to the first heat-source-side heat exchanger 26a undergoes heat exchange with outside air fed by the first heat-source-side fan 36a and radiates heat in the first heat-source-side heat exchanger 26a. The high-pressure heat-source-side refrigerant radiated in the first heat-source-side heat exchanger 26a is sent to the first subcooler 31a by way of the first heat-source-side expansion valve 28a. The heat-source-side refrigerant sent to the first subcooler 31a is cooled so that the heat-source-side refrigerant branched from the first heat-source-side liquid-refrigerant tube 27a to the first intake return tube 29a undergoes heat exchange with the heat-source-side refrigerant and is brought to a subcooled state. The heat-source-side refrigerant that flows through the first intake return tube 29a is returned to the heat-source-side intake tube 21c. The heat-source-side refrigerant in the first subcooler 31a is sent to the heat-source-side liquid-refrigerant junction tube 27 by way of the first heat-source-side liquid-refrigerant tube 27a. A portion of the high-pressure heat-source-side refrigerant sent to the heat-source-side liquid-refrigerant junction tube 27 is sent to the liquid-refrigerant communication tube 13 by way of the liquid-side closing valve 33, and the remainder is sent to the second heat-source-side liquid-refrigerant tube 27b.

The high-pressure heat-source-side refrigerant sent to the discharge refrigerant communication tube 12 is branched into two flows and sent to the usage units 5a, 5b.

The high-pressure heat-source-side refrigerant sent from the discharge refrigerant communication tube 12 to the usage units 5a, 5b is sent to the first usage-side heat exchangers 51a, 51b via the first usage-side gas-refrigerant tubes 54a, 54b. The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent to the usage-side heat exchange inlet/outlet connection tubes 53a, 53b by way of the first usage-side expansion valves 52a, 52b.

The heat-source-side refrigerant sent to the liquid-refrigerant communication tube 13 is branched into two flows and sent to the usage units 5a, 5b.

The high-pressure heat-source-side refrigerant sent from the liquid-refrigerant communication tube 13 to the usage units 5a, 5b is merged in the usage-side heat exchange inlet/outlet connection tubes 53a, 53b with the heat-source-side refrigerant which has radiated heat in the first usage-side heat exchangers 51a, 51b. The heat-source-side refrigerant merged in the usage-side heat exchange inlet/outlet connection tubes 53a, 53b is sent to the second usage-side expansion valves 152a, 152b. The heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b. The low-pressure heat-source-side refrigerant sent to the second usage-side heat exchangers 151a, 151b evaporates in the second usage-side heat exchangers 151a, 151b by exchanging heat with the aqueous medium circulated by the second circulation pumps 171a, 171b through the aqueous medium circuits 70a, 70b. The low-pressure heat-source-side refrigerant evaporated in the second usage-side heat exchangers 151a, 151b is sent from the usage units 5a, 5b to the intake refrigerant communication tube 14 by way of the usage-side heat exchanger outlet on/off valves 154a, 154b and the second usage-side gas-refrigerant tubes 153a, 153b and merged therein.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the heat-source-side liquid-refrigerant junction tube 27 to the second heat-source-side liquid-refrigerant tube 27b is sent to the second subcooler 31b. The heat-source-side refrigerant sent to the second subcooler 31b without undergoing heat exchange because the heat-source-side refrigerant does not flow to the second intake return tube 29b is sent to the heat-source-side expansion valve 28b. The heat-source-side refrigerant sent to the second heat-source-side expansion valve 28b is depressurized in the second heat-source-side expansion valve 28b to form a low-pressure gas-liquid two-phase state, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with the outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the second circulation pumps 171a, 171b from the usage units 5a, 5b to the aqueous medium communication tubes 16a, 16b by way of the second usage-side water outlet tubes 174a, 174b and the first usage-side water outlet tubes 74a, 74b. The aqueous medium sent to the aqueous medium communication tubes 16a, 16b is sent to the aqueous medium air cooling/warming units 75a, 75b. The aqueous medium sent to the aqueous medium air cooling/warming units 75a, 75b is heated in the heat exchange panels 76a, 76b, whereby the indoor space along the walls or the like is cooled, and the indoor floor is also cooled.

In the aqueous medium circuits 70a, 70b, the aqueous medium circulating through the aqueous medium circuits 70a, 70b is heated by the heat radiation of the heat-source-side refrigerant in the refrigerant/water heat exchangers 57a, 57b. The aqueous medium heated in the refrigerant/water heat exchangers 57a, 57b is by the first circulation pumps 71a, 71b to the hot-water storage tanks 161a, 161b by way of the first usage-side water outlet tubes 74a, 74b and the hot-water storage tank-side water inlet tubes 176a, 176b. The heat exchange coils 162a, 162b radiate heat by performing heat exchange with the aqueous medium inside the hot-water storage tanks 161a, 161b to heat the aqueous medium inside the hot-water storage tanks 161a, 161b.

In this manner, operation in the simultaneous air cooling/warming operation mode (mainly heat radiation) for performing a mixed air-cooling and air-warming operation (and/or hot-water supply operation) is performed in astute in which at least one of the usage units 5a, 5b is set to air-cooling/hot-water supply operation for simultaneously carrying out air-cooling operation and hot-water supply operation.

—Full Air-cooling Operation Mode—

In the case that only air-cooling operation of the usage units 5a, 5b is to be performed, the first and second heat-source-side switching mechanisms 23a, 23b are switched to the heat-source-side heat-radiation operating state (the state of the first and second heat-source-side switching mechanisms 23a, 23b indicated by the solid lines in FIG. 1) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 1). The first usage-side expansion valves 52a, 52b are switched to be closed, and the usage-side heat exchanger outlet on/off valves 154a, 154b are opened. The cool/warm water switching mechanisms 175a, 175b are switched to a state in which the aqueous medium cooled in the second usage-side heat exchangers 151a, 151b is fed to the aqueous-medium air-cooling/warming units 75a, 75b. In this description, all of the usage units 5a, 5b are set for air-cooling operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil is separated out in the oil separator 22a from the high-pressure heat-source side refrigerant discharged to the heat-source-side discharge tube 21b. The refrigeration machine oil separated out from the heat-source-side refrigerant in the oil separator 22a is returned to the heat-source-side intake tube 21c by way of the oil return tube 22b. The high-pressure heat-source-side refrigerant from which the refrigeration machine oil has been separated out is sent to the heat-source-side heat exchangers 26a, 26b by way of the heat-source-side switching mechanisms 23a, 23b and the heat-source-side gas-refrigerant tubes 24a, 24b. The high-pressure heat-source-side refrigerant sent to the heat-source-side heat exchangers 26a, 26b radiates heat in the heat-source-side heat exchangers 26a, 26b by exchanging heat with the outdoor air fed by the heat-source-side fans 36a, 36b. The high-pressure heat-source-side refrigerant which has radiated heat in the heat-source-side heat exchangers 26a, 26b is sent to the subcoolers 31a, 31b by way of the heat-source-side expansion valves 28a, 28b. The heat-source-side refrigerant sent to the subcoolers 31a, 31b is cooled to a subcooled state by exchanging heat with the heat-source-side refrigerant branched from the heat-source-side liquid-refrigerant tubes 27a, 27b to the intake return tubes 29a, 29b. The heat-source-side refrigerant that flows through the intake return tubes 29a, 29b is returned to the heat-source-side intake tube 21c. The heat-source-side refrigerant cooled in the subcoolers 31a, 31b is sent from the heat source unit 2 to the liquid-refrigerant communication tube 13 by way of the heat-source-side liquid-refrigerant tubes 27a, 27b, the heat-source-side liquid-refrigerant junction tube 27, and the liquid-side closing valve 33.

The high-pressure heat-source-side refrigerant sent to the liquid-refrigerant communication tube 13 is branched into two flows and sent to the usage units 5a, 5b.

The high-pressure heat-source-side refrigerant sent to the usage units 5a, 5b is sent to the second usage-side expansion valves 152a, 152b. The high-pressure heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b. The low-pressure heat-source-side refrigerant sent to the second usage-side heat exchangers 151a, 151b evaporates in the second usage-side heat exchangers 151a, 151b by exchanging heat with the aqueous medium circulated by the second circulation pumps 171a, 171b through the aqueous medium circuits 70a, 70b. The low-pressure heat-source-side refrigerant evaporated in the second usage-side heat exchangers 151a, 151b is sent from the usage units 5a, 5b to the intake refrigerant communication tube 14 by way of the usage-side heat exchanger outlet on/off valves 154a, 154b and the second usage-side gas-refrigerant tubes 153a, 153b and merged therein.

The low-pressure heat-source-side refrigerant sent to the intake refrigerant communication tube 14 is sent to the heat source unit 2. The low-pressure heat-source-side refrigerant sent to the heat source unit 2 is again taken into the heat-source-side compressor 21 by way of the intake-side closing valve 34, the heat-source-side gas-refrigerant tube 25, and the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the second circulation pumps 171a, 171b from the usage units 5a, 5b to the aqueous medium communication tubes 16a, 16b by way of the second usage-side water outlet tubes 174a, 174b and the first usage-side water outlet tubes 74a, 74b. The aqueous medium sent to the aqueous medium communication tubes 16a, 16b is sent to the aqueous-medium air-cooling/warming units 75a, 75b. The aqueous medium sent to the aqueous-medium air-cooling/warming units 75a, 75b is heated in the heat exchange panels 76a, 76b, whereby the indoor space along the walls or the like is cooled, and the indoor floor is also cooled.

In this manner, operation in the full air-cooling operation mode is performed in which only air-cooling operation of the usage units 5a, 5b is performed.

—Switching Operation Modes, and Controlling Heat Load Balance—

As described above, the heat pump system 1 is capable of handling operating states in which the air-cooling operation (cooling operation) or the air-warming operation and/or hot-water supply operation (heating operation) are arbitrarily set for each of the usage units 5a, 5b by switching operating modes. In other words, in a state in which the air-cooling operation or air-warming operation (and/or the hot-water supply operation) is set for each of the usage units 5a, 5b, the heat pump system 1 causes the first and second heat-source-side heat exchangers 26a, 26b to function as evaporators of the heat-source-side refrigerant or as radiators of the heat-source-side refrigerant in accordance with the heat load of all the usage units 5a, 5b, making it possible to perform operation in which the heat load of all the usage units 5a, 5b is balanced.

In the heat pump system 1, switching the operating modes described above and controlling the heat load balance are performed in the manner described below.

First, the controller 1a determines whether the operating mode is the full air-warming operation mode, the simultaneous air cooling/warming operation mode, or the full air-cooling operation mode on the basis of the operating state set in the usage units 5a, 5b. In other words, the controller determines that the mode is the full air-warming operation mode in the case that there are only usage units set for the air-warming operation (and/or the hot-water supply operation). The controller determines that the mode is the simultaneous air cooling/warming operation mode in the case of a mixed air-cooling and air-warming operation (and/or hot-water supply operation). Specifically, the determination is made based on the on/off states and the like of the first usage-side expansion valves 52a, 52b and the second usage-side expansion valves 152a, 152b of the usage units 5a, 5b.

The controller 1a controls the operating capacity of the heat-source-side compressor 21 so that the heat-source-side condensing temperature Tc1 corresponding to the saturation temperature of the heat-source-side refrigerant in the discharge of the heat-source-side compressor 21 reaches a predetermined target heat-source-side condensing temperature Tc1s in the case of the full air-warming operation mode. More specifically, the controller 1a performs control so as to increase the operating capacity of the heat-source-side compressor 21 by increasing the rotational speed (i.e., operational frequency) of the heat-source-side compressor 21 in the case that the heat-source-side condensing temperature Tc1 is less than the target heat-source-side condensing temperature Tc1s. This makes it possible to resolve a state in which the evaporation load of the heat-source-side refrigerant in the heat-source-side heat exchangers 26b is less than the heat load of the all the usage units 5a, 5b, and to balance the two loads. The controller 1a performs control so as to reduce the operating capacity of the heat-source-side compressor 21 by reducing the rotational speed (i.e., operational frequency) of the heat-source-side compressor 21 in the case that the heat-source-side condensing temperature Tc1 is greater than the target heat-source-side condensing temperature Tc1s. This makes it possible to resolve a state in which the evaporation load of the heat-source-side refrigerant in the heat-source-side heat exchangers 26a, 26b is greater than the heat load of the all the usage units 5a, 5b, and to balance the two loads. The heat-source-side condensing temperature Tc1 is a value obtained by converting the heat-source-side discharge pressure Pd1, which is the pressure of the heat-source-side refrigerant in the discharge of the heat-source-side compressor 21, to the saturation temperature that corresponds to this pressure value. The heat-source-side condensing temperature Tc1 corresponds to a value obtained by converting the high-pressure in the refrigeration cycle of the heat-source-side refrigerant circuit 20 to the saturation temperature, i.e., the saturation temperature (condensing temperature) of the heat-source-side refrigerant in the first usage-side heat exchanger for performing air-warming operation (and/or hot-water supply operation) among the first usage-side heat exchangers 51a, 51b.

The controller 1a controls the operating capacity of the heat-source-side compressor 21 so that the heat-source-side condensing temperature Te1 reaches the target heat-source-side condensing temperature Tc1s in the case of the simultaneous air cooling/warming operation mode. However, in the case of a mixed air-cooling and air-warming operation (and/or hot-water supply operation) of the usage units 5a, 5b, the heat load of all the usage units 5a, 5b tends to be reduced and the heat load required by the heat-source-side heat exchangers 26a, 26b tends to be reduced as well. In view of the above, in the simultaneous air cooling/warming operation mode, one of the heat-source-side switching mechanisms 23a, 23b is switched to the heat-source-side heat-radiation operating state, and the other of the heat-source-side switching mechanisms 23a, 23b is switched to the heat-source-side evaporation operating state as described above while controlling the operating capacity of the heat-source-side compressor 21. The evaporative capability in the heat-source-side heat exchangers that function as evaporators of the heat-source-side refrigerant is increased to offset the radiation capacity of the heat-source-side heat exchangers that function as radiators of the heat-source-side refrigerant, and to reduce the heat load of all the heat-source-side heat exchangers 26a, 26b. This makes it possible to handle a state in which the heat load of all the usage units 5a, 5b is low, such as the simultaneous air cooling/warming operation mode, and to balance the two loads. The heat-source-side condensing temperature Tel corresponds to the saturation temperature (condensing temperature) of the heat-source-side refrigerant in the heat-source-side heat exchanger that functions as a radiator of the heat-source-side refrigerant among the heat-source-side heat exchangers 26a, 26b.

In the case of full air-cooling operation mode, the controller 1a controls the operating capacity of the heat-source-side compressor 21 so that the heat-source-side evaporation temperature Te1, which corresponds to the saturation temperature of the heat-source-side refrigerant in the intake of the heat-source-side compressor 21, reaches a predetermined target heat-source-side evaporation temperature Te1s. More specifically, the controller 1a performs control so as to reduce the operating capacity of the heat-source-side compressor 21 by reducing the rotational speed (i.e., operational frequency) of the heat-source-side compressor 21 in the case that the heat-source-side evaporation temperature Te1 is less than the target heat-source-side evaporation temperature Te1s. This makes it possible to resolve a state in which the radiation load of the heat-source-side refrigerant in the heat-source-side heat exchangers 26a, 26b is greater than the heat load of the all the usage units 5a, 5b, and to balance the two loads. The controller 1a performs control so as to increase the operating capacity of the heat-source-side compressor 21 by increasing the rotational speed (i.e., operational frequency) of the heat-source-side compressor 21 in the case that the heat-source-side evaporation temperature Te1 is greater than the target heat-source-side evaporation temperature Te1s. This makes it possible to resolve a state in which the radiation load of the heat-source-side refrigerant in the heat-source-side heat exchangers 26a, 26b is less than the heat load of the all the usage units 5a, 5b, and to balance the two loads. The heat-source-side evaporation temperature Te1 is a value obtained by converting the heat-source-side intake pressure Ps1, which is the pressure of the heat-source-side refrigerant in the intake of the heat-source-side compressor 21, to the saturation temperature that corresponds to this pressure value. The heat-source-side evaporation temperature Tel corresponds to a value obtained by converting the low-pressure in the refrigeration cycle of the heat-source-side refrigerant circuit 20 to a saturation temperature, i.e., the saturation temperature (condensing temperature) of the heat-source-side refrigerant in the usage-side heat exchanger that performs air-cooling operation among the second usage-side heat exchangers 151a, 151b.

—Controlling the Usage-Side Condensing Temperature, and Setting the Target Usage-side Condensing Temperature and the Target Heat-source-side Condensing Temperature—

With the heat pump system 1, the usage-side refrigerant circulating through the usage-side refrigerant circuits 50a, 50b is heated in the first usage-side heat exchangers 51a, 51b by heat radiation of the heat-source-side refrigerant circulating through the heat-source-side refrigerant circuit 20 during the full air-warming operation mode and the simultaneous air cooling/warming operation mode, as described above. The usage-side refrigerant circuits 50a, 50b can achieve a refrigeration cycle having a temperature greater than the refrigeration cycle in the heat-source-side refrigerant circuit 20 by using the heat obtained from the heat-source-side refrigerant. Therefore, a high-temperature aqueous medium can he obtained by heat radiation of the usage-side refrigerant in the refrigerant/water heat exchangers 57a, 57b. At this point, it is preferred that control be performed so that the refrigeration cycle in the heat-source-side refrigerant circuit 20 and the refrigeration cycle in the usage-side refrigerant circuits 50a, 50b are stabilized in order to stably obtain a high-temperature aqueous medium.

In view of the above, the controller 1a controls the operating capacity of the heat-source-side compressor 21 described above, and controls the operating capacity of the usage-side compressors 55a, 55b so that the usage-side condensing temperatures Tc2a, Tc2b, which correspond to the saturation temperatures of the usage-side refrigerant in the discharge of the usage-side compressors 55a, 55b, reach predetermined target usage-side condensing temperatures Tc2as, Tc2bs. More specifically, the controller 1a performs control so that the operating capacity of the usage-side compressors 55a, 55b is increased by increasing the rotational speed (i.e., operational frequency) of the usage-side compressors 55a, 55b in the case that the usage-side condensing temperatures Tc2a, Tc2b are less than the target usage-side condensing temperatures Tc2as, Tc2bs. The controller 1a performs control so that operating capacity of the usage-side compressors 55a, 55b is reduced by reducing the rotational speed (i.e., operational frequency) of the usage-side compressors 55a, 55b in the case that the usage-side condensing temperatures Tc2a, Tc2b are greater than the target usage-side condensing temperatures Tc2as, Tc2bs. The pressure of the heat-source-side refrigerant that flows through the first usage-side heat exchangers 51a, 51b is thereby stabilized in the heat-source-side refrigerant circuit 20, and the pressure of the usage-side refrigerant that flows through the refrigerant/water heat exchangers 57a, 57b is stabilized in the usage-side refrigerant circuits 50a, 50b. The state of the refrigeration cycle in the refrigerant circuits 20, 50a, 50b can be stabilized and a high-temperature aqueous medium can be obtained in a stable manner. The usage-side condensing temperatures Tc2a, Tc2b are values obtained by converting the usage-side discharge pressures Pd2a, Pd2b, which are the pressures of the usage-side refrigerant in the discharge of the usage-side compressors 55a, 55b, to saturation temperatures that correspond to these pressure values. The usage-side condensing temperatures Tc2a, Tc2b are values obtained by converting the high pressure in the refrigeration cycle of the usage-side refrigerant circuits 50a, 50b to saturation temperatures, i.e., the saturation temperatures (condensing temperatures) of the usage-side refrigerant in the refrigerant/water heat exchanger that carries out air-warming operation among the refrigerant/water heat exchangers 57a, 57b.

In this case, it is preferred that the target heat-source-side condensing temperature Tc1s and the target usage-side condensing temperatures Tc2as, Tc2bs be appropriately set in order to obtain the aqueous medium setting temperature required in the usage units 5a, 5b.

In view of the above, the controller 1a sets the target usage-side condensing temperatures Tc2as, Tc2bs for the usage-side refrigerant circuits 50a, 50b on the basis of the target aqueous medium outlet temperatures Twl1as, Twl1bs, which are the temperature settings of the aqueous medium at the outlet of the refrigerant/water heat exchangers 57a, 57b. More specifically, the target usage-side condensing temperatures Tc2as, Tc2bs are set as values that vary with the target aqueous medium outlet temperatures Twl1as, Twl1bs. For example, the target usage-side condensing temperatures Tc2as, Tc2bs are set to 85° C. in the case that the target aqueous medium outlet temperatures Twl1as, Twl1bs are set to 75° C. The target usage-side condensing temperatures Tc2as, Tc2bs are set to 513° C. in the case that the target aqueous medium outlet temperatures Twl1as, Twl1bs are set to 40° C. In other words, the target usage-side condensing temperatures Tc2as, Tc2bs are converted to functions and set so as to increase with increased settings for the target aqueous medium outlet temperatures Twl1as, Twl1bs, and so as to be a slightly higher than the target aqueous medium outlet temperatures Twl1as, Twl1bs. Since the target usage-side condensing temperatures Tc2as, Tc2bs are thereby appropriately set on the basis of the target aqueous medium outlet temperatures Twl1as, Twl1bs, the target aqueous medium outlet temperatures Twl1as, Twl1bs are more readily obtained, and control with good responsiveness can be obtained even when the target aqueous medium outlet temperatures Twl1as, Twl1bs have been modified.

In relation to the heat-source-side refrigerant circuit 20, the controller 1a sets the target heat-source-side condensing temperature Tc1s on the basis of the target usage-side condensing temperatures Tc2as, Tc2bs (i.e., the target aqueous medium outlet temperatures Twl1as, Twl1bs). More specifically, the target heat-source-side condensing temperature Tc1s is set as a value that varies depending on the target usage-side condensing temperatures Tc2as, Tc2bs (i.e., the target aqueous medium outlet temperatures Twl1as, Twl1bs). In other words, the target heat-source-side condensing temperature Tc1s is converted to a function and set so as to increase with increased settings for the target usage-side condensing temperatures Tc2as, Tc2bs (i.e., target aqueous medium outlet temperatures Twl1as, Twl1bs). The refrigeration cycle in the heat-source-side refrigerant circuit 20 can be appropriately controlled in accordance with the state of the refrigeration cycle in the usage-side refrigerant circuits 50a, 50b because the target heat-source-side condensing temperature Tc1s is appropriately set based on the target usage-side condensing temperatures Tc2as, Tc2bs the target aqueous medium outlet temperatures Twl1as, Twl1bs).

—Setting the Target Heat-source-side Evaporation Temperature—

In the heat pump system 1, in the full air-cooling operation mode, the usage-side refrigerant circulating through the usage-side refrigerant circuits 50a, 50b is cooled in the second usage-side heat exchangers 151a, 151b by evaporation of the heat-source-side refrigerant circulating through the heat-source-side refrigerant circuit 20, as described above. At this point, it is preferred that the target heat-source-side evaporation temperature Te1s be appropriately set in order to obtain the aqueous-medium temperature setting required in the usage units 5a, 5b.

In view of the above, the controller 1a sets the target heat-source-side evaporation temperature Te1s for the heat-source-side refrigerant circuit 20 on the basis of the target aqueous medium outlet temperatures Twl2as, Twl2bs. More specifically, the target heat-source-side evaporation temperature Te1s is set as a value that varies with the target aqueous medium outlet temperatures Twl2as, Twl2bs. In other words, the target heat-source-side evaporation temperature Te1s is converted to a function and set so as to increase with increased settings for the target aqueous medium outlet temperatures Twl2as, Twl2bs. Since the target heat-source-side evaporation temperature Te1s is thereby appropriately set on the basis of the target aqueous medium outlet temperatures Twl2as, Twl2bs, the refrigeration cycle in the heat-source-side refrigerant circuit 20 can be appropriately controlled.

<Characteristics>

The heat pump system 1 has the following characteristics

—A—

In the heat pump system 1, the heat source unit is provided in a shared fashion to a plurality (two, in this configuration) of usage units 5a, 5b for carrying out air-warming operation and/or hot-water supply operation (heating operation) using an aqueous medium. Accordingly, the heat source unit 2 can be installed in a shared space of a residential complex or the like. Cooling operation can be carried out because the usage units 5a, 5b have second usage-side heat exchangers 151a, 151b for air-cooling operation (cooling operation) in addition to the first usage-side heat exchangers 51a, 51b for air-warming operation and/or hot-water supply operation. Also, with this heat pump system 1, operation can be carried out with the air-cooling operation or the air-warming operation (and/or hot-water supply operation) set for each of the usage units 5a, 5b.

In this manner, the heat pump system 1 is suitable for residential complexes or the like because air-cooling operation and air-warming operation (and/or hot-water supply operation) can be carried out individually for each housing unit or the like while solving the problems of installation space for the heat source unit 2 and the need for air-cooling operation.

—B—

With this heat pump system 1, the air-cooling operation (cooling operation), and the air-warming operation and/or hot-water supply operation (heating operation) can be carried out simultaneously in the usage units 5a, 5b because the heat source unit 2 and the plurality of (two, in this configuration) of usage units 5a, 5b are connected by three refrigerant communication tubes (the discharge refrigerant communication tube 12, liquid-refrigerant communication tube 13, and intake refrigerant communication tube 14). Therefore, indoor air cooling by the air-cooling operation and hot water supply by the hot-water supply operation can be carried out simultaneously in the usage units 5a, 5b, for example. Accordingly, the heat pump system 1 is useful in residential complexes or the like in which hot water supply and air cooling are carried out simultaneously in each housing unit or the like.

With the heat pump system 1, the connection between the liquid-refrigerant communication tube 13 and the usage units 5a, 5b is a single connection because the connection between the liquid-refrigerant communication tube 13, and first usage-side heat exchangers 51a, 51b and the second usage-side heat exchangers 151a, 151b is made via the usage-side heat exchange inlet/outlet connection tubes 53a, 53b. Accordingly, with this heat pump system 1, mounting of the refrigerant tubes between the heat source unit 2 and the usage units 5a, 5b is facilitated.

In this manner, with the heat pump system 1, the mounting the refrigerant tubes between the heat source unit 2 and the usage units 5a, 5b can be facilitated while simultaneously carrying out the cooling operation and the hot-water supply operation for each of the usage units 5a, 5b.

—C—

With this heat pump system 1, there are two aqueous medium-tube systems, i.e., a system of aqueous medium tubes (the system of the first usage-side water inlet tube 73a, 73b, and the first usage-side water outlet tubes 74a, 74b) through which flows the aqueous medium heated by the air-warming operation (heating operation) using the first usage-side heat exchangers 51a, 51b, and a system of aqueous medium tubes (system of the second usage-side water inlet tubes 173a, 173b and the second usage-side water outlet tubes 174a, 174b) through which flows the aqueous medium cooled by the air-cooling operation (cooling operation) using the second usage-side heat exchangers 151a, 151b.

In the configuration in which these two aqueous medium tube systems are drawn out to the exterior of the usage units 5a, 5b and connected to the aqueous medium air-cooling/warming units 75a, 75b (aqueous medium usage apparatuses), there is a problem in that the mounting of the aqueous medium tubes between the usage units 5a, 5b and the aqueous medium air cooling/warming units 75a, 75b becomes complicated.

In view of this problem, this heat pump system 1 has cool/warm water switching mechanisms 175a, 175b disposed inside the usage units 5a, 5b, which allows selective interchange of the aqueous medium heated by the air-warming operation or the aqueous medium cooled by the air-cooling operation, between the aqueous medium air cooling/warming units 75a, 75b.

With this heat pump system 1, it is therefore possible to facilitate mounting of the aqueous medium tubes between the usage units 5a, 5b and the aqueous medium air cooling/warming units 75a, 75b because a system having a single shared aqueous medium tube (the aqueous medium communication tubes 15a, 16a, 15b, 16b) is used in place of a system having two aqueous medium tubes connected between the usage units 5a, 5b and the aqueous medium air cooling/warming units 75a, 75b.

—D—

With this heat pump system 1, it is possible to do away with the on-location work of connecting the aqueous medium tubes between the usage units 5a, 5b and the hot-water storage tanks 161a, 161b, and the mounting of the aqueous medium tubes can be facilitated because the hot-water storage tanks 161a, 161b are disposed inside the usage units 5a, 5b.

—E—

With the heat pump system 1, the aqueous medium can be heated by a dual refrigerant cycle carried out by the heat-source-side refrigerant circuit 20 and the usage-side refrigerant circuits 50a, 50b during the air-warming operation and/or the hot-water supply operation (heating operation). Therefore, a high-temperature aqueous medium can be obtained during the air-warming operation and the hot-water supply operation.

With the heat pump system 1, HFC-134a, which is a refrigerant in which the pressure that corresponds to a saturated gas temperature of 65° C. is a maximum gauge pressure of 2.8 MPa or less, is used as the usage-side refrigerant in the air-warming operation and/or hot-water supply operation (heating operation). The heat pump system 1 is useful in applications that require a high-temperature aqueous medium such as radiators and a hot-water supply, because it is possible to perform heating operation for heating the aqueous medium to 65° C. or higher.

—F—

The heat-source-side evaporation temperature $Te1$, which is the temperature that corresponds to the saturation temperature of the heat-source-side refrigerant in the heat-source-side heat exchangers 26a, 26b functioning as refrigerant evaporators, tends to become very low in the case that outside air temperature is low and the heat-source-side heat exchangers 26a, , 26b functioning as evaporators of the heat-source-side refrigerant are present (during simultaneous air cooling/warming operation mode and the full air-warming operation mode). Therefore, the temperature of the heat-source-side refrigerant in the second usage-side heat exchangers 151a, 151b is reduced and the aqueous medium tends to cool and freeze when air-cooling operation (cooling operation) is not performed.

In view of this situation, in the heat pump system 1, the outlet of the heat-source-side refrigerant of the second usage-side heat exchangers 151a, 151b is provided with usage-side heat exchanger outlet on/off valves 154a, 154b which are shut off when air-cooling operation is not performed and are opened when air-cooling operation is performed.

The heat-source-side refrigerant of the second usage-side heat exchangers 151a, 151b can thereby be prevented from acquiring a low temperature when air-cooling operation is not being performed, and freezing of the aqueous medium can be suppressed.

<Modification 1>

In order to further efficiently use the air-cooling/hot-water supply operation in the above-described heat pump system (referring to FIG. 1), in the case that hot-water storage temperatures Twha, Twhb, which are the temperatures of the aqueous medium stored in the hot-water storage tanks 161a, 161b, become equal to or lower than the predetermined hot-water storage temperature settings Twhas, Twhbs during the air-cooling operation (cooling operation), the hot-water supply operation (heating operation), that is the air-cooling/hot-water supply operation, may be performed in the usage units 5a, 5b.

Figure 2:
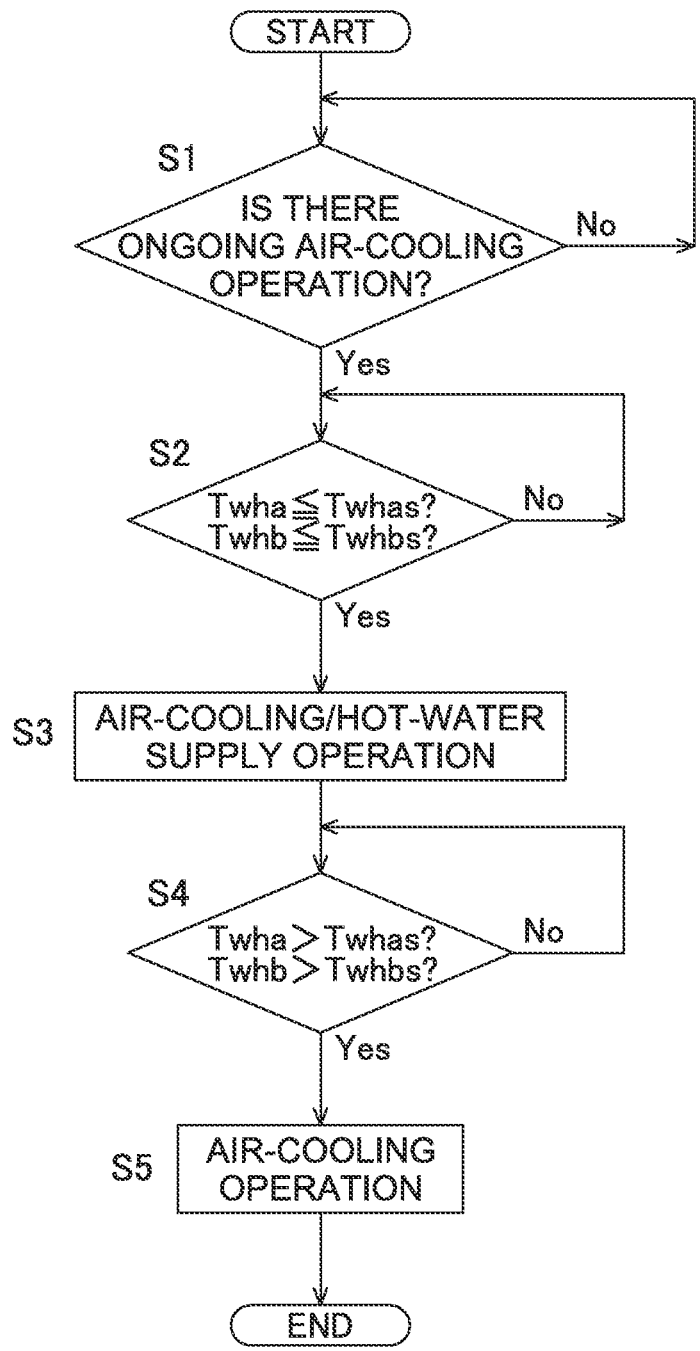
FIG. 2 is a flowchart showing transition processing from air-cooling operation to air-cooling hot-water supply operation according to Modification 1.

For example, it is possible to perform a transition from the air-cooling operation to the air-cooling/hot-water supply operation in accordance with the flowchart shown in FIG. 2.

First, the controller 1a determines whether there is a usage unit present that is performing air-cooling operation among the usage units 5a, 5b (step S1).

The controller 1a then determines (step S2) whether the hot-water storage temperature (in this case, the hot-water storage temperature Twha and/or the hot-water storage temperature Twhb) in the hot-water storage tank of the usage unit for performing the air-cooling operation is equal to or less than a hot-water storage temperature setting (in this case, the hot-water storage temperature setting Twhas and/or the hot-water storage temperature setting Twhbs).

In the case that it is determined in step S2 that a hot-water storage tank is present which the hot-water storage temperature is equal to or less than the hot-water storage temperature setting, the controller 1a performs (step S3) air-cooling/hot-water supply operation in the usage unit having the hot-water storage tank in which the hot-water storage temperature is equal to or less than the hot-water storage temperature setting.

The controller 1a then determines (step S4) whether the hot-water storage temperature has been brought above the hot-water storage temperature setting by the air-cooling/hot-water supply operation.

In the case that it has been determined in step S4 that the hot-water storage temperature has risen above the hot-water storage temperature setting, the controller 1a switches the usage unit to air-cooling operation (step S5).

With the heat pump system 1 of the present modification, the hot-water storage temperatures Twha, Twhb can therefore be kept at the hot-water storage temperature settings Twhas, Twhbs or higher while the heat obtained by the heat-source-side refrigerant can be efficiently used by cooling the aqueous medium in the air-cooling operation. This is because the air-cooling/hot-water supply operation is performed when the hot-water storage temperatures Twha, Twhb are equal to or lower than the hot-water storage temperature settings Twhas, Twhbs. Also, since the transition from the air-cooling operation to the air-cooling/hot-water supply operation can be performed for each of the usage units 5a, 5b, the heat provided to the heat-source-side refrigerant by cooling the aqueous medium in the air-cooling operation is efficiently used in each residence in a residential complex or the like, and energy can be saved.

<Modification 2>

With this heat pump system 1 (see FIG. 1), the target temperature (e.g., the target aqueous medium outlet temperatures Twl2as, Twl2bs) of the aqueous medium required in each of the usage units 5a, 5b may be different in the case that a plurality of usage units (in this case two) are carrying out air-cooling operation (cooling operation) because the usage units 5a, 5b are individually operated in each housing unit or the like of a residential complex.

As a result, the efficiency of operations becomes unnecessarily low depending on the operating conditions of the usage units 5a, 5b when air-cooling operation is carried out based on the lowest target temperature predicted in all the usage units 5a, 5b.

In view of the above, with the heat pump system 1 of the present modification, the target heat-source-side evaporation temperatures Te1as, Te1bs of the usage units 5a, 5b carrying out air-cooling operation are computed based on the target temperature of the aqueous medium required in the usage units 5a, 5b carrying out the air-cooling operation, and the operating capacity of the heat-source-side compressor 21 is controlled so that the heat-source-side evaporation temperature becomes the minimum value among the plurality (two, in this case) of target heat-source-side evaporation temperatures Te1as, Te1bs.

In the case that the plurality (two, in this case) of usage units 5a, 5b are carrying out air-warming operation and/or hot-water supply operation (heating operation), the target temperatures (e.g., the target aqueous medium outlet temperatures Twl1as, Twl1bs) of the aqueous medium required in the usage units 5a, 5b may be different.

As a result, the efficiency of operations becomes unnecessarily low depending on the operating conditions of the plurality of usage units 5a, 5b when air-warming operation or hot-water supply operation is carried out based on the highest target temperature predicted in all the usage units 5a, 5b.

In view of the above, with the heat pump system 1 of the present modification, the target heat-source-side condensing temperatures Tc1as, Tc1bs of the usage units 5a, 5b carrying out air-warming operation or hot-water supply operation are computed based on the target temperature of the aqueous medium required in the usage units 5a, 5b carrying out the air-warming operation or hot-water supply operation, and the operating capacity of the heat-source-side compressor 21 is controlled so that the heat-source-side condensing temperature Tc1 becomes the maximum value among the plurality (two, in this case) of target heat-source-side condensing temperatures Tc1as, Tc1bs.

Figure 3:
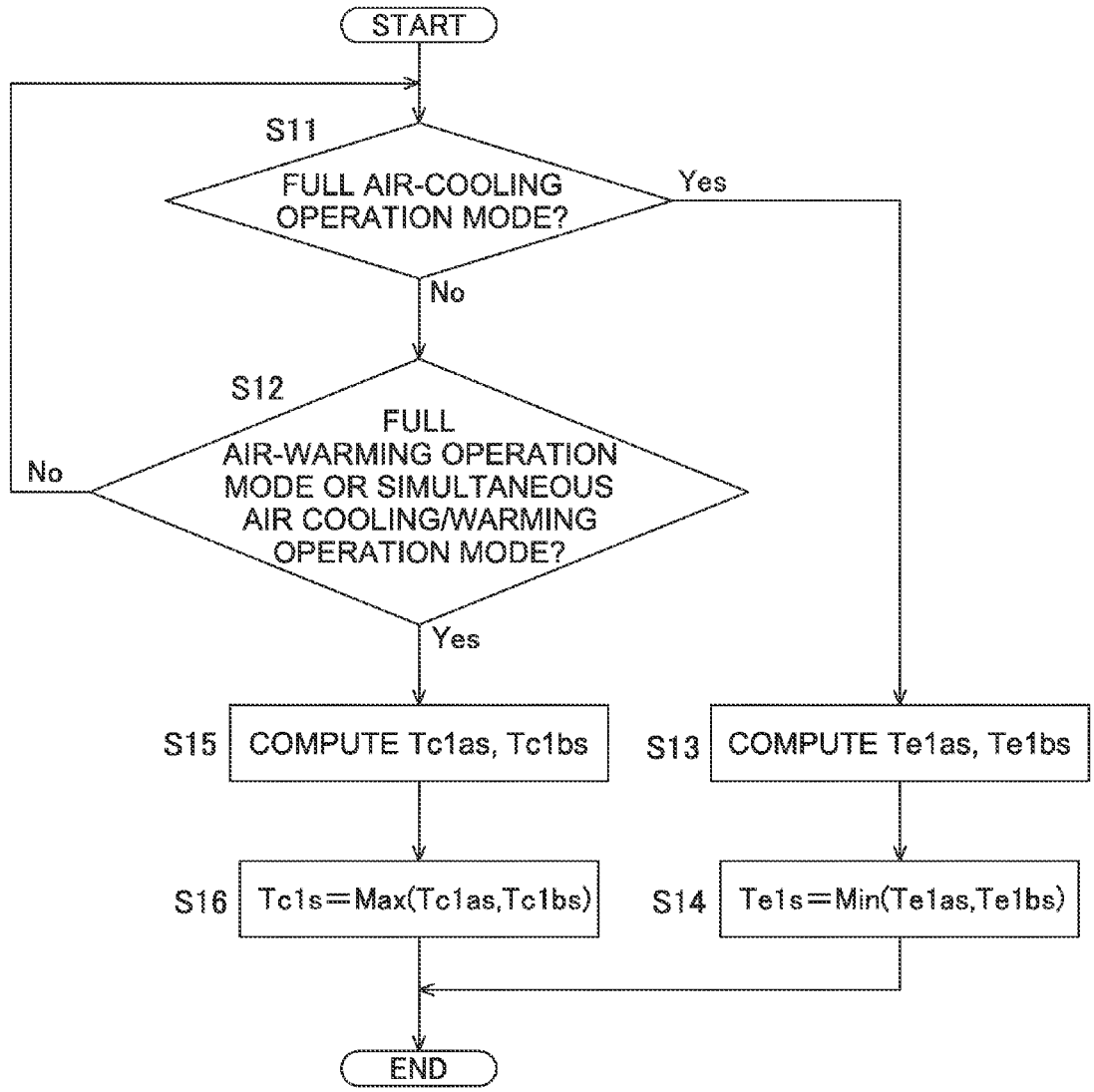
FIG. 3 is a flowchart showing processing for setting the target heat-source-side condensing temperature or the target heat-source-side evaporation temperature according to Modification 2.

For example, processing for setting target heat-source-side condensing temperature Tc1s or the target heat-source-side evaporation temperature Te1s can be carried out in accordance with the flowchart shown in FIG. 3.

The controller 1a determines whether the mode is the full air-cooling operation mode (step S11), or whether the mode is the full air-warming operation mode or the simultaneous air cooling/warming operation mode (step S12).

In the case that it has been determined in step S11 that the mode is the full air-cooling operation mode, the controller 1a computes (step 513) the target heat-source-side evaporation temperatures Te1as, Te1bs of the usage units 5a, 5b carrying out air-cooling operation on the basis of the target temperatures of the aqueous medium (in this case, the target aqueous medium outlet temperatures Twl2as, Twl2bs) required in the usage units 5a, 5b carrying out the air-cooling operation.

The controller 1a sets the minimum value among the target heat-source-side evaporation temperatures Te1as, Te1bs obtained in step S13 to be the target heat-source-side evaporation temperature Te1s (step S14).

On the other hand, in the case it has been determined in step S12 that the mode is the full air-warming operation mode or the simultaneous air cooling/warming operation mode, the controller 1a computes (step S15) the target heat-source-side condensing temperatures Tc1as, Tc1bs of the usage units 5a, 5b carrying out the air-warming operation or the hot-water supply operation on the basis of the target temperatures (target aqueous medium outlet temperatures Twl1as, Twl1bs) of the aqueous medium required in the usage units 5a, 5b carrying out the air-warming operation or the hot-water supply operation.

The controller 1a sets the maximum value among the target heat-source-side condensing temperatures Tc1as, Tc1bs obtained in step S14 to be the target heat-source-side condensing temperature Tc1s (step S16).

With the heat pump system 1 of the present modification, the air-cooling operation is therefore carried out based on the lowest target temperature among the target temperatures of the aqueous medium required in the usage units 5a, 5b carrying out the air-cooling operation. Accordingly, with the heat pump system 1 of the present modification, cooling operation at unnecessarily low efficiency can be suppressed because cooling operation is not carried out based on an unnecessarily low target temperature. Also, with the heat pump system 1 of the present modification, the air-warming operation or hot-water supply operation is carried out based on the highest target temperature among the target temperatures of the aqueous medium required in the usage units 5a, 5b carrying out the air-warming operation or the hot-water supply operation. Accordingly, with the heat pump system 1 of the present modification, heating operation or hot-water supply operation at unnecessarily low efficiency can be suppressed because the air-warming operation or the hot-water supply operation is not carried out based on an unnecessarily high target temperature.

<Modification 3>

With the heat pump system 1 (see FIG. 1) described above, sound related to operation changes when the operating capacity of the usage-side compressors 55a, 55b is rapidly changed can be noisy to residents or others depending on the installation location of each housing unit or the like, because the usage units 5a, 5b having usage-side compressors 55a, 55b are provided to each housing unit or the like of a residential complex.

In view of such a possibility, with the heat pump system 1 of the present modification, low-noise control is carried out in which the operating capacity of the usage-side compressors 55a, 55b is varied in a stepwise fashion in the case that the operating capacity of the usage-side compressors 55a, 55b is to be varied during air-warming operation and hot-water supply operation.

Figure 4:
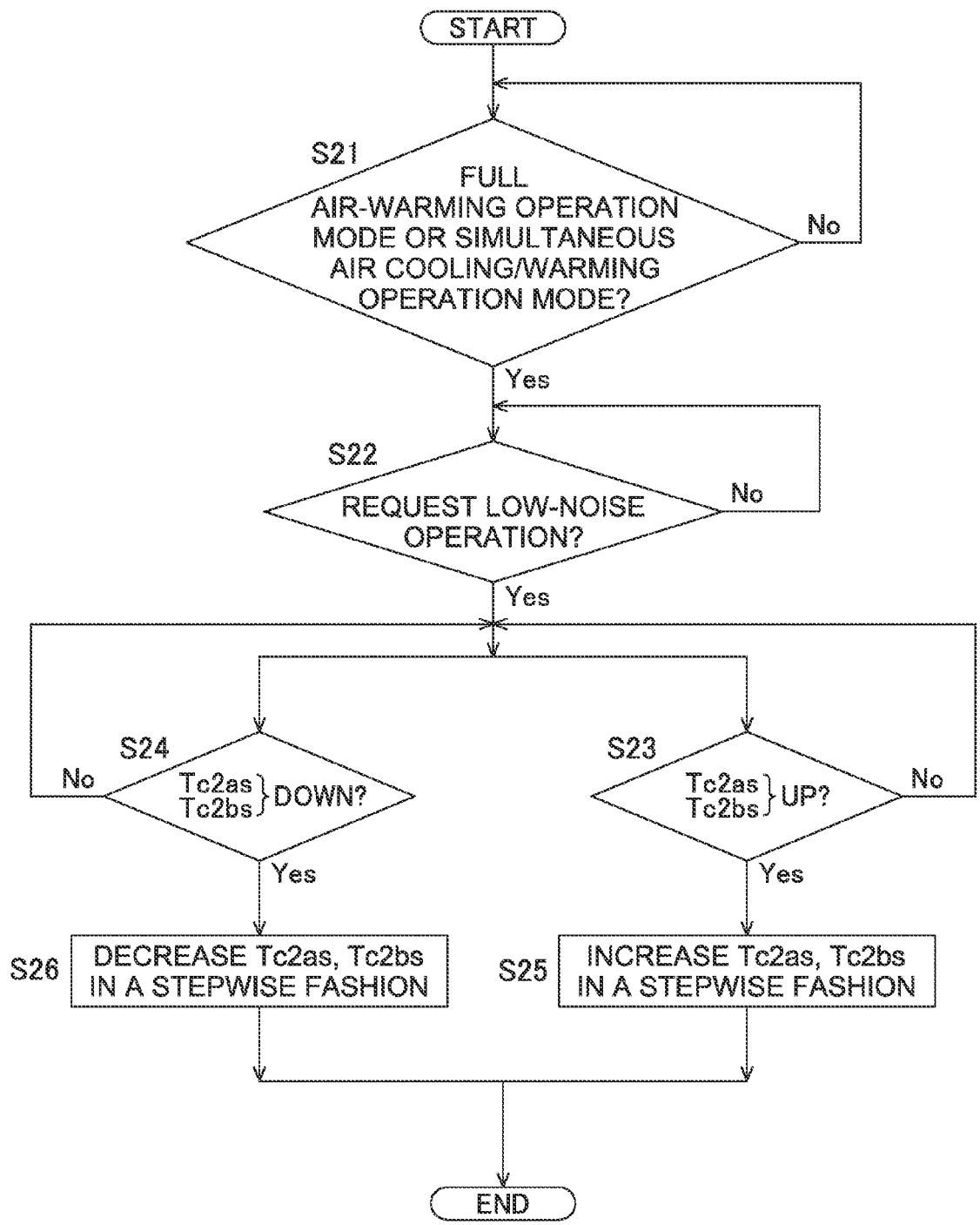
FIG. 4 is a flowchart showing a processing of low-noise control according to Modification 3.

For example, low-noise control can be carried out in accordance with the flowchart shown in FIG. 4.

First, the controller 1a determines whether the mode is the full air-warming operation mode or the simultaneous air cooling/warming operation mode (step S21).

In the case that it has been determined in step S21 that the mode is the full air-warming operation mode or the simultaneous air cooling/warming operation mode, the controller 1a determines whether a request for low-noise operation has been inputted from a remote controller or the like (step 22).

In the case that it has been determined that a request for low-noise operation has been inputted in step S22, the controller 1a determines whether a change has been requested (step S23) for increasing the target usage-side condensing temperatures Tc2as, Tc2bs, or a change has been requested (step S24) for reducing the target usage-side condensing temperatures Tc2as, Tc2bs.

In the case that a modification request has been made to increase the target usage-side condensing temperatures Tc2as, Tc2bs in step s23, the modification to increase the target usage-side condensing temperatures Tc2as, Tc2bs is made in a stepwise fashion until the modification request value is reached (step S25). Here, cases in which a modification request is made to increase the target usage-side condensing temperatures Tc2as, Tc2bs include the case in which a modification is made for increasing the target temperatures (the target aqueous medium outlet temperatures Twl1as, Twl1bs) of the aqueous medium requested by the usage units 5a, 5b by a remote controller or the like.

On the other hand, in the case that a modification request has been made to reduce the target usage-side condensing temperatures Tc2as, Tc2bs in step S24, the modification to reduce the target usage-side condensing temperatures Tc2as, Tc2bs is made in a stepwise fashion until the modification request value is reached (step S26). Here, cases in which a modification request is made to reduce the target usage-side condensing temperatures Tc2as, Tc2bs include the case in which a modification is made for reducing the target temperatures (the target aqueous medium outlet temperatures Twl1as, Twl1bs) of the aqueous medium requested in each of the usage units 5a, 5b by a remote controller or the like.

With the heat pump system 1 of the present modification, the operating capacity of the usage-side compressors 55a, 55b can therefore be gradually increased when a modification request has been made to increase the target usage-side condensing temperatures Tc2as, Tc2bs and the operating capacity of the usage-side compressors 55a, 55b is controlled to be increased. The sound related to operation changes when the operating capacity of the usage-side compressors 55a, 55b is increased can therefore be kept to a minimum amount of noise. Also, with the heat pump system 1 of the present modification, the operating capacity of the usage-side compressors 55a, 55b can be gradually reduced when a modification request has been made to reduce the target usage-side condensing temperatures Tc2as, Tc2bs and the operating capacity of the usage-side compressors 55a, 55b is controlled to be reduced. Therefore, the sound related to operation changes when the operating capacity of the usage-side compressors 55a, 55b is reduced can therefore be kept to a minimum amount of noise.

(3) Other Embodiments

Embodiments of the present invention and modifications thereof were described with reference to the drawings, but specific configurations are not limited to these embodiments and modifications thereof, and it is possible to make modifications within a range that does not depart from the spirit of the invention.

—A—

In the heat pump system 1 described above, HFC-134a is used as the usage-side refrigerant, but no limitation is imposed thereby, and it is also possible to use, e.g., HFO-1234yf (2,3,3,3-tetrafluoro-1-propene) or another refrigerant in which the pressure that corresponds to a saturated gas temperature of 65° C. is a maximum gauge pressure of 2.8 MPa or less, preferably 2.0 MPa or less.

—B—

With the heat pump system 1 described above, the configuration has two heat-source-side heat exchangers 26a, 26b provided to the heat source unit 2, but another possible configuration is one in which a single heat-source-side heat exchanger is provided. In this case, operation may be carried out to balance the overall heat load of the usage units 5a, 5b by switching the heat source switching mechanism to a heat-source-side heat-radiation operating state or a heat-source-side evaporation operating state.

—C—

In the heat pump system 1 described above, usage-side refrigerant circuits 50a, 50b are provided to the usage units 5a, 5b in order to obtain a high-temperature aqueous medium during the air-warming operation and the hot-water supply operation, but in the case that a high-temperature aqueous medium is not required, the first usage-side heat exchangers 51a, 51b may be heat exchangers in which the aqueous medium is heated by exchanging heat between the aqueous medium and the heat-source-side refrigerant.

—D—

In the heat pump system 1 described above, a configuration is used in which there are a plurality of connected usage units 5a, 5b having the first usage-side heat exchangers 51a, 51b and the second usage-side heat exchangers 151a, 151b; however, no limitation is imposed thereby, and it is also possible to use a configuration in which there are a plurality of connected usage units 5a, 5b having the first usage-side heat exchangers 51a, 51b and the second usage-side heat exchangers 151a, 151b, as well a plurality of connected usage units that do not have the second usage-side heat exchangers 151a, 151b.

INDUSTRIAL APPLICABILITY

The present invention can be widely used in heat pump systems configured by connecting a usage unit for performing

REFERENCE SIGNS LIST

1 Heat pump system
1a Controller
2 Heat source unit
5a, 5b Usage units
12 Discharge refrigerant communication tube
13 Liquid-refrigerant communication tube
14 Intake refrigerant communication tube
20 Heat-source-side refrigerant circuit
21 Heat-source-side compressor
26a, 26b Heat-source-side heat exchangers
50a, 50b Usage-side refrigerant circuits
51a, 51b First usage-side heat exchangers
53a, 53b Usage-side heat exchange inlet/outlet connection tubes
55a, 55b Usage-side compressors
57a, 57b Refrigerant/water heat exchangers
75a, 75b Aqueous medium air-cooling/warming units (aqueous medium usage apparates)
151a, 151b Second usage-side heat exchangers
154a, 154b Usage-side heat exchanger outlet on/off valves
161a, 161b Hot-water storage tanks
175a, 175b Cool/warm water switching mechanisms
Tc1 Heat-source-side condensing temperature
Tc1as, Tc1bs Target heat-source-side condensing temperatures
Te1 Heat-source-side evaporation temperature
Te1as, Te1bs Target heat-source-side evaporation temperatures
Twha, Twhb Hot-water storage temperatures
Twhas, Twhbs Hot-water storage temperature settings
Twl1as, Twl1bs Target aqueous medium outlet temperatures (target temperatures of the aqueous medium)
Twl2as, Twl2bs Target aqueous medium outlet temperatures (target temperatures of the aqueous medium)

CITATION LIST

Patent Literature

<Patent Literature 1>
Japanese Laid-open Patent Application No. 60-164157
<Patent Literature 2>
Japanese Laid-open Patent Application No. 2003-314838

What is claimed is:

1. A heat pump system comprising:
    a heat-source-side refrigerant circuit having usage units connected to a heat source unit via refrigerant communication tubes, the heat source unit having a heat-source-side heat exchanger and a heat-source-side compressor configured to compress a heat-source-side refrigerant, and the usage units having first usage-side heat exchangers; and
    a controller configured to carry out a heating operation in which an aqueous medium is heated by heat radiation of the heat-source-side refrigerant in the first usage-side heat exchangers,
    the usage units further having second usage-side heat exchangers that function as an evaporator of the heat-source-side refrigerant, and
    the controller being further configured to cause the heat-source-side heat exchanger to function as an evaporator of the heat-source-side refrigerant or as a radiator of the heat-source-side refrigerant in accordance with an overall heat load of the plurality of first and second usage-side heat exchangers when the heating operation or a cooling operation has been set for each of the usage units, the aqueous medium being cooled by evaporation of the heat-source-side refrigerant in the second usage-side heat exchangers in the cooling operation, and
    to carry out an operation to balance an overall heat load of the plurality of first and second usage-side heat exchangers.

2. The heat pump system according to claim 1, wherein the refrigerant communication tubes have
    a discharge refrigerant communication tube configured to draw out the heat-source-side refrigerant from a discharge of the heat-source-side compressor to an exterior of the heat source unit,
    a liquid-refrigerant communication tube configured to draw out the heat-source-side refrigerant from an outlet of the heat-source-side heat exchanger functioning as a radiator of the heat-source-side refrigerant to the exterior of the heat source unit, and to introduce the heat-source-side refrigerant from the exterior of the heat source unit to an inlet of the heat-source-side heat exchanger functioning as an evaporator of the heat-source-side refrigerant, and
    an intake refrigerant communication tube configured to introduce the heat-source-side refrigerant from the exterior of the heat source unit to an intake of the heat-source-side compressor;
    the discharge refrigerant communication tube is connected to the usage units so that the heat-source-side refrigerant is introduced from the exterior of the usage units to the inlet of the first usage-side heat exchangers;
    usage-side heat exchanger connection tubes are provided inside the usage units, the usage-side heat exchanger connection tubes being configured to connect the outlet of the heat-source-side refrigerant of the first usage-side heat exchangers and the inlet of the heat-source-side refrigerant of the second usage-side heat exchangers; and
    the liquid-refrigerant communication tube is connected to the usage units so as to introduce the heat-source-side refrigerant from the exterior of the usage units to the usage-side heat exchanger connection tubes.

3. The heat pump system according to claim 1, wherein
    water switching mechanisms are disposed inside of the usage units in order to allow selective interchange of the aqueous medium heated by the heating operation or the aqueous medium cooled by the cooling operation, between aqueous medium usage units disposed outside the usage units.

4. The heat pump system according to claim 1, wherein
    the usage units are configured to simultaneously carry out the heating operation and the cooling operation.

5. The heat pump system according to claim 4, further comprising
    hot-water storage tanks configured to store the aqueous medium heated by the heating operation or the aqueous medium heated by heat exchange with the aqueous medium heated by the heating operation,
    the controller is further configured to carry out the heating operation when hot-water storage temperatures of the aqueous medium stored in the hot-water storage tank during the cooling operation have reached or fallen below predetermined hot-water storage temperature settings.

6. The heat pump system according to claim 5, wherein the hot-water storage tanks are disposed inside the usage units.

7. The heat pump system according to claim 1, wherein the usage units further have usage-side compressors configured to compress a usage-side refrigerant, and refrigerant-water heat exchangers configured to heat the aqueous medium by heat exchange between the usage-side refrigerant and the aqueous medium; and the usage-side compressors, the refrigerant-water heat exchangers, and the first usage-side heat exchangers form parts of usage-side refrigerant circuits configured to carry out an operation in which the refrigerant-water heat exchangers function as radiators of the usage-side refrigerant, and the first usage-side heat exchangers function as evaporators of the usage-side refrigerant and as radiators of the heat-source-side refrigerant during the heating operation.

8. The heat pump system according to claim 7, wherein the controller is further configured to vary operating capacity of the usage-side compressors in a stepwise fashion when operating capacity of the usage-side compressors is varied during the heating operation.

9. The heat pump system according to claim 1, wherein usage-side heat exchanger outlet valves are provided at outlets of the heat-source-side refrigerant of the second usage-side heat exchangers, the usage-side heat exchanger outlet valves are shut off when the cooling operation is not carried out and are open when the cooling operation is carried out.

10. The heat pump system according to claim 1, wherein the controller is further configured to compute target heat-source-side evaporation temperatures, which are target values of saturation temperatures of the heat-source-side refrigerant in the second usage-side heat exchangers of the usage units carrying out the cooling operation, based on target temperatures of the aqueous medium required in the usage units carrying out the cooling operation when the plurality of usage units are carrying out the cooling operation; and the controller is further configured to control operating capacity of the heat-source-side compressors so that a heat-source-side evaporation temperature that corresponds to a saturation temperature of the heat-source-side refrigerant in an intake of the heat-source-side compressor becomes a minimum value of the plurality of target heat-source-side evaporation temperatures.

11. The heat pump system according to claim 1, wherein the controller is further configured to compute target heat-source-side condensing temperatures, which are target values of saturation temperatures of the heat-source-side refrigerant in the first usage-side heat exchangers of the usage units carrying out the heating operation, based on target temperatures of the aqueous medium required in the usage units carrying out the heating operation when the plurality of usage units are carrying out the heating operation; and the controller is further configured to control operating capacity of the heat-source-side compressors so that a heat-source-side condensing temperature that corresponds to a saturation temperature of the heat-source-side refrigerant in a discharge of the heat-source-side compressor becomes a maximum value of the plurality of target heat-source-side condensing temperatures.

12. The heat pump system according to claim 2, wherein water switching mechanisms are disposed inside of the usage units in order to allow selective interchange of the aqueous medium heated by the heating operation or the aqueous medium cooled by the cooling operation, between aqueous medium usage units disposed outside the usage units.

13. The heat pump system according to claim 12, wherein the usage units are configured to simultaneously carry out the heating operation and the cooling operation.

14. The heat pump system according to claim 13, further comprising hot-water storage tanks configured to store the aqueous medium heated by the heating operation or the aqueous medium heated by heat exchange with the aqueous medium heated by the heating operation, the controller is further configured to carry out the heating operation when hot-water storage temperatures of the aqueous medium stored in the hot-water storage tank during the cooling operation have reached or fallen below predetermined hot-water storage temperature settings.

15. The heat pump system according to claim 2, wherein the usage units are configured to simultaneously carry out the heating operation and the cooling operation.

16. The heat pump system according to claim 3, wherein the usage units are configured to simultaneously carry out the heating operation and the cooling operation.

* * * * *